United States Patent
Chen et al.

(10) Patent No.: US 9,045,651 B2
(45) Date of Patent: Jun. 2, 2015

(54) ANTIFOULING SURFACES, METHODS OF MANUFACTURE THEREOF AND ARTICLES COMPRISING THE SAME

(75) Inventors: Jiun-Jeng Chen, Gainesville, FL (US); Anthony B. Brennan, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 115 days.

(21) Appl. No.: 13/164,600

(22) Filed: Jun. 20, 2011

(65) Prior Publication Data

US 2011/0311769 A1 Dec. 22, 2011

Related U.S. Application Data

(60) Provisional application No. 61/357,254, filed on Jun. 22, 2010.

(51) Int. Cl.
| | |
|---|---|
| *C09D 5/16* | (2006.01) |
| *C08F 220/06* | (2006.01) |
| *C08F 220/56* | (2006.01) |
| *B63B 59/04* | (2006.01) |
| *C08F 220/58* | (2006.01) |

(52) U.S. Cl.
CPC ............... *C09D 5/1668* (2013.01); *B63B 59/04* (2013.01); *C08F 220/06* (2013.01); *C08F 220/56* (2013.01); *C08F 220/58* (2013.01); *C09D 5/1693* (2013.01)

(58) Field of Classification Search
CPC .................................................... C09D 5/1668
See application file for complete search history.

(56) References Cited

U.S. PATENT DOCUMENTS

| | | | |
|---|---|---|---|
| 4,599,390 A * | 7/1986 | Fan et al. ...................... 526/240 |
| 5,620,738 A * | 4/1997 | Fan et al. ...................... 427/2.3 |
| 6,906,128 B2 * | 6/2005 | Cadena et al. ................ 524/522 |
| 7,622,533 B2 * | 11/2009 | Lee ............................. 525/328.9 |
| 2004/0101442 A1 * | 5/2004 | Frechet et al. .................. 422/99 |
| 2006/0148977 A1 | 7/2006 | Finnie |
| 2007/0155892 A1 | 7/2007 | Gharapetian et al. |
| 2008/0020948 A1 | 1/2008 | Rodrigues et al. |
| 2010/0136353 A1 | 6/2010 | Schellenkens et al. |

(Continued)

FOREIGN PATENT DOCUMENTS

EP 0506782 B1 8/1996

OTHER PUBLICATIONS

Wilson, Leslie Hoipkemeier, "Bioresponse to Polymeric Substrates: Effect of Surface Energy, Modulus, Topography, and Surface Graft Copolymers", 2005, http://etd.fcla.edu/UF/UFE0011624/wilson_I.pdf.*

(Continued)

*Primary Examiner* — Aaron Austin
*Assistant Examiner* — Jasper Saberi
(74) *Attorney, Agent, or Firm* — Cantor Colburn LLP

(57) ABSTRACT

Disclosed herein is an article comprising a substrate; a polymer disposed upon the substrate; the polymer having a number average molecular weight of about 2,000 to about 5,000 grams per mole; where each polymer is separated from a neighboring polymer by an average distance of 2.5 Angstroms to 5,000 Angstroms. Disclosed herein is a method comprising disposing upon a substrate a polymer; the polymer having a number average molecular weight of 2,000 to about 5,000 grams per mole.

13 Claims, 6 Drawing Sheets

(56) References Cited

U.S. PATENT DOCUMENTS

2010/0145286 A1* 6/2010 Zhang et al. .................. 604/265
2010/0152708 A1* 6/2010 Li et al. ......................... 604/523

OTHER PUBLICATIONS

G.A. Aguilar et al, "Statistically Designed Study of Oligomeric Dispersants Based on Acrylic Acid, Acrylamide, Methyl Acrylate, and Acrylamido-2-methyl-1-propanesulfonic acid", Sep. 1997, Polymer Preprints, vol. 38, No. 2.*

Odian, "Principles of Polymerization", 2004, John Wiley & Sons, 4th edition, p. 22.*

International Search Report dated Feb. 29, 2012 for International Application No. PCT/US2011/041390, 6 pages.

Written Opinion of the International Searching Authority mailed Feb. 29, 2012 for International Application No. PCT/US2011/041390, 6 pages.

* cited by examiner

ANTIFOULING SURFACES, METHODS OF MANUFACTURE THEREOF AND ARTICLES COMPRISING THE SAME

CROSS-REFERENCE TO RELATED APPLICATIONS

This application claims priority to U.S. Provisional Patent Application No. 61/357,254 filed on Jun. 22, 2010 the entire contents of which are hereby incorporated by reference in their entirety.

STATEMENT REGARDING FEDERALLY SPONSORED RESEARCH & DEVELOPMENT

The U.S. Government has certain rights in this invention pursuant to the U.S. Office of Naval Research Grant No. N00014-10-1-0579.

BACKGROUND

Disclosed herein are antifouling surfaces, methods of manufacture thereof and articles comprising the same.

Biofouling is the unwanted accumulation of organic and inorganic matter of biological origin on surfaces. For example, in a marine environment, biofouling is the result of marine organisms settling, attaching, and growing on submerged marine surfaces. The biofouling process is initiated within minutes of a surface being submerged in a marine environment. Biofouling generally begins by the absorption of dissolved organic materials, which result in the formation of a conditioning film. Once the conditioning film is deposited, bacteria (e.g. unicellular algae) colonize the surface within hours of submersion. The resulting biofilm produced from the colonization of the bacteria is referred to as microfouling or slime and can reach thicknesses on the order of 500 micrometers ("µm").

Biofouling is estimated to cost the U.S. Navy alone over $1 billion per year by increasing the hydrodynamic drag of naval vessels. This in turn decreases the range, speed, and maneuverability of naval vessels and increases the fuel consumption by up to 30 to 40%. Biofouling thus impedes national defense in addition to causing economic hardship. Biofouling is also a major burden on commercial shipping, recreational craft, as well as civil structures, bridges, and power generating facilities.

Any substrate in regular contact with water is likely to become fouled. No surface has been found that is completely resistant to fouling. Due to the vast variety of marine organisms that form biofilms, the development of a single surface coating with fixed surface properties for preventing biofilm formation for all relevant marine organisms is a difficult if not impossible task.

Anti-fouling and fouling-release coatings are two main approaches currently used for combating biofilm formation. Anti-fouling coatings prevent or deter the settling of biofouling organisms on a surface by the use of leached biocides, typically cuprous oxide or tributyltin, into the water. The biocides are either tethered to the coated surface or are released from the surface into the surrounding environment. Use of these types of coatings has caused damage to the marine ecosystem, especially in shallow bays and harbors, where the biocides can accumulate. As such, the use of tributyltin has been banned in many parts of the world. These products are effective for only approximately 2 to 5 years.

Fouling release coatings present a hydrophobic, low surface energy, and resulting slippery surface that minimizes the adhesion of the biofouling organisms. The most commonly used and highly successful of these is a nontoxic silicone-based paint. The silicone-based coating requires several layers to make it effective, and therefore it can be quite costly. Effectiveness lasts up to 5 years at which time recoating may become necessary. These products are considered to be more environmentally sound as compared to anti-fouling coatings because they do not leach toxins. However, they are subject to abrasion, and therefore their use is limited to areas that are not susceptible to damage caused by ice or debris.

Biofouling is similarly a problem for surfaces used in biomedical applications. The accumulation of bacteria to form a biofilm on implanted devices such as orthopedic prostheses presents a significant risk of infection leading to complications as severe as death. In cosmetic implants, devices such as breast implants are fouled with fibroblasts and acellular extracellular matrix resulting in a hard fibrous capsule and subsequent implant rupture. Blood contacting surfaces such as artificial heart valves and artificial vascular grafts are fouled by proteins such as fibrinogen that initiate the coagulation cascade leading in part to heart attack and stroke. The accumulated affect of biofouling on chronic and acute disease states, its contribution to morbidity and its massive medical expenses places biofouling as one of the major issues facing modern medicine.

SUMMARY

Disclosed herein is an article comprising a substrate; a polymer disposed upon the substrate; the polymer having a number average molecular weight of about 2,000 to about 5,000 grams per mole; where each polymer is separated from a neighboring polymer by an average distance of 2.5 Angstroms to 5,000 Angstroms.

Disclosed herein is a method comprising disposing upon a substrate a polymer; the polymer having a number average molecular weight of 2,000 to about 5,000 grams per mole.

DETAILED DESCRIPTION

Figure 1:
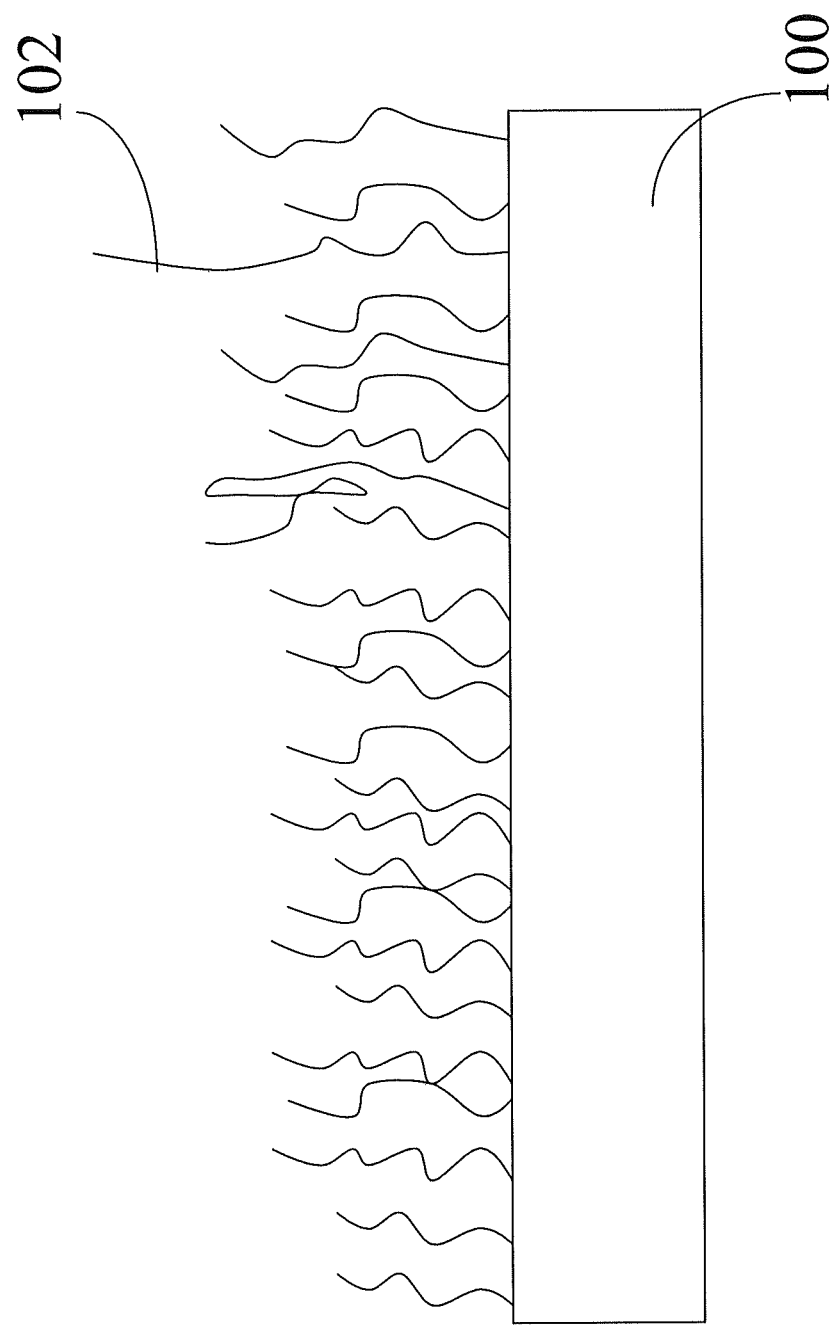
FIG. 1 is a depiction of an exemplary substrate with a polymer disposed thereon.

The invention now will be described more fully hereinafter with reference to the accompanying drawings, in which various embodiments are shown. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The transition term "comprising" encompasses the transition terms "consisting of" and "consisting essentially of"

Various numerical ranges are disclosed herein. These ranges are inclusive of the endpoints as well as numerical values between these endpoints. The numbers in these ranges and those on the endpoints are interchangeable.

All molecular weights referred to herein are number average molecular weights, unless otherwise stated.

Disclosed herein are articles that comprise a substrate that have disposed upon them polymers that have molecular weights of about 2,000 to about 5,000 grams per mole (g/mole). Larger molecular weight polymers can be interspersed between the polymers that have molecular weights of about 2,000 to about 5,000 g/mole. The polymers that have molecular weights of about 2,000 to about 5,000 g/mole can be derived from a single monomer or from a combination of two or more different types of monomers. These surfaces can be advantageously used to control bioadhesion and to prevent biofouling.

In one embodiment, the polymers can be synthesized from monomers in the presence of the substrate. In another embodiment, the polymers can be synthesized independently (not in the presence of the surface) and then reacted onto the substrate.

FIG. 1 is a depiction of an exemplary substrate 100 that comprises polymers 102 having a number average molecular weight of about 2,000 to about 5,000 g/mole. In one embodiment, polymers (termed "second" polymers) having a number average molecular weight greater than 5,000 g/mole are interspersed amongst the polymers having number average molecular weight of about 2,000 to about 5,000 g/mole. The polymer are spaced from about 2.5 Angstroms to about 5,000 Angstroms apart, specifically about 3.5 to about 4,000 Angstroms apart, specifically about 4.5 to about 1,000 Angstroms, specifically about 5 to about 50 Angstroms apart.

The substrate 100 can have a smooth surface or can alternatively be textured. The substrate 100 can comprise organic polymers, inorganic materials comprising ceramics or metals, or combinations of the organic polymers and the inorganic materials.

The substrate 100 can comprise organic polymers. Organic polymers include a wide variety of thermoplastic polymers, blend of thermoplastic polymers, thermosetting polymers, or blends of thermoplastic polymers with thermosetting polymers. The organic polymer may also be a blend of polymers, copolymers, terpolymers, or combinations comprising at least one of the foregoing organic polymers. The organic polymer can also be an oligomer, a homopolymer, a copolymer, a block copolymer, an alternating block copolymer, a random polymer, a random copolymer, a random block copolymer, a graft copolymer, a star block copolymer, a dendrimer, a polyelectrolyte (polymers that have some repeat groups that comprise electrolytes), a polyampholyte (a polyelectrolyte having both cationic and anionic repeat groups), an ionomer, or the like, or a combination comprising at last one of the foregoing organic polymers.

Examples of the organic polymers are polyacetals, polyolefins, polyacrylics, polycarbonates, polystyrenes, polyesters, polyamides, polyamideimides, polyarylates, polyarylsulfones, polyacrylates, polymethacrylates, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, styrene acrylonitrile, acrylonitrile-butadiene-styrene (ABS), polyethylene terephthalate, polybutylene terephthalate, polyurethane, ethylene propylene diene rubber (EPR), polytetrafluoro ethylene, perfluoroelastomers, fluorinated ethylene propylene, perfluoroalkoxyethylene, polychlorotrifluoroethylene, polyvinylidene fluoride, polysiloxanes, or the like, or a combination comprising at least one of the foregoing organic polymers.

Examples of polyelectrolytes are polystyrene sulfonic acid, polyacrylic acid, pectin, carageenan, alginates, carboxymethylcellulose, polyvinylpyrrolidone, or the like, or a combination comprising at least one of the foregoing polyelectrolytes.

Examples of thermosetting polymers include epoxy polymers, unsaturated polyester polymers, polyimide polymers, bismaleimide polymers, bismaleimide triazine polymers, cyanate ester polymers, vinyl polymers, benzoxazine polymers, benzocyclobutene polymers, acrylics, alkyds, phenolformaldehyde polymers, novolacs, resoles, melamine-formaldehyde polymers, urea-formaldehyde polymers, hydroxymethylfurans, isocyanates, diallyl phthalate, triallyl cyanurate, triallyl isocyanurate, unsaturated polyesterimides, or the like, or a combination comprising at least one of the foregoing thermosetting polymers.

Examples of blends of thermoplastic polymers include acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, nylon/elastomers, polyester/elastomers, polyethylene terephthalate/polybutylene terephthalate, acetal/elastomer, styrene-maleic anhydride/acrylonitrile-butadiene-styrene, polyether etherketone/polyethersulfone, polyether etherketone/polyetherimide polyethylene/nylon, polyethylene/polyacetal, or the like.

In one embodiment, biodegradable polymers can also be used to manufacture the surface 100. Suitable examples of biodegradable polymers are as polylactic-glycolic acid (PLGA), poly-caprolactone (PCL), copolymers of polylactic-glycolic acid and poly-caprolactone (PCL-PLGA copolymer), polyhydroxy-butyrate-valerate (PHBV), polyorthoester (POE), polyethylene oxide-butylene terephthalate (PEO-PBTP), poly-D,L-lactic acid-p-dioxanone-polyethylene glycol block copolymer (PLA-DX-PEG), or the like, or combinations comprising at least one of the foregoing biodegradable polymers. The biodegradable polymers upon undergoing degradation can be consumed by the body without any undesirable side effects.

The substrate can include inorganic materials. The inorganic materials can comprise inorganic oxides, inorganic carbides, inorganic nitrides, inorganic hydroxides, inorganic oxides having hydroxide coatings, inorganic carbonitrides, inorganic oxynitrides, inorganic borides, inorganic borocarbides, or the like, or a combination comprising at least one of the foregoing inorganic materials. Examples of suitable inorganic materials are metal oxides, metal carbides, metal nitrides, metal hydroxides, metal oxides having hydroxide coatings, metal carbonitrides, metal oxynitrides, metal borides, metal borocarbides, or the like, or a combination comprising at least one of the foregoing inorganic materials.

Examples of suitable inorganic oxides include silica ($SiO_2$), alumina ($Al_2O_3$), titania ($TiO_2$), zirconia ($ZrO_2$), ceria ($CeO_2$), manganese oxide ($MnO_2$), zinc oxide (ZnO), iron oxides (e.g., FeO, $\gamma$-$Fe_2O_3$, $Fe_3O_4$, or the like), calcium oxide (CaO), manganese dioxide ($MnO_2$ and $Mn_3O_4$), or combinations comprising at least one of the foregoing inorganic oxides. Examples of inorganic carbides include silicon carbide (SiC), titanium carbide (TiC), tantalum carbide (TaC), tungsten carbide (WC), hafnium carbide (HfC), or the like, or a combination comprising at least one of the foregoing carbides. Examples of suitable nitrides include silicon nitrides ($Si_3N_4$), titanium nitride (TiN), or the like, or a combination comprising at least one of the foregoing. Examples of suitable borides are lanthanum boride ($LaB_6$), chromium borides (CrB and $CrB_2$), molybdenum borides ($MoB_2$, $Mo_2B_5$ and MoB), tungsten boride ($W_2B_5$), or the like, or combinations comprising at least one of the foregoing borides. Exemplary inorganic substrates are those that comprise naturally occurring or synthetically prepared silica and/or alumina.

Metals used in the substrate can be transition metals, alkali metals, alkaline earth metals, rare earth metals, or the like, or a combination comprising at least one of the foregoing metals. Examples of metals are iron, copper, aluminum, tin, tungsten, chromium, gold, silver, titanium, or a combination comprising at least one of the foregoing metals.

As noted above, the substrate can be smooth or textured. The textured substrate can have structures that are disposed on the substrate or projected into the substrate. These structures produce a rough surface on the substrate. In one embodiment, these structures can be uniformly disposed upon the surface to produce a patterned surface. In another embodiment, the structures can be randomly disposed upon the surface. The structures that are disposed upon the substrate can have a variety of different cross-sectional geometries. For example, the structures can have cross-sectional geometries (measured perpendicular to a surface of the substrate upon which the structures are disposed) that are polygons or are bounded by curved surfaces. Examples of polygons are triangles, squares, rectangles, parallelograms, pentagons, hexagons, octagons, decagons, and the like. Examples of structures that are bound by curved surfaces are circles, ellipses, Archimedean spirals, astroids, deltoids, super ellipses, tomahawks, salinons, gombocs, and the like. Combinations of different structures may be disposed upon the substrate or projected into the substrate to produce the texture.

The roughness factor (R) is a measure of surface roughness. R is defined herein as the ratio of actual surface area ($R_{act}$) to the geometric surface area ($R_{geo}$); $R=R_{act}/R_{geo}$). An example is provided for a 1 $cm^2$ piece of material. If the sample is completely flat, the actual surface area and geometric surface area would both be 1 $cm^2$. However if the flat surface was roughened by patterning, such as using photolithography and selective etching, the resulting actual surface area becomes much greater that the original geometric surface area due to the additional surface area provided by the sidewalls of the structures generated. For example, if by roughening the exposed surface area becomes twice the surface area of the original flat surface, the R value would thus be 2.

The topography generally provides a roughness factor (R) of at least 2. It is believed that the effectiveness of a patterned coating according to the invention will improve with increasing pattern roughness above an R value of about 2, and then likely level off upon reaching some higher value of R. In a preferred embodiment, the roughness factor (R) is at least 4, such as 5, 6, 7, 8, 9, 10 11, 12, 13, 14, 15, 16, 17, 18, 19, 20, 25 or 30. Assuming deeper and more closely spaced structures can be provided, R values can be higher than 30.

In one embodiment, the different structures may be disposed upon the substrate in a manner effective to produce fractal geometry. Fractal exponents for the textured surfaces may be measured and determined in a plane that includes a surface of the substrate or in a plane perpendicular to a surface of the substrate.

In one embodiment, the fractals can be surface fractals. The fractal dimensions can have fractional powers of about 1.00 to about 3.00, specifically about 1.25 to about 2.25, more specifically about 1.35 to about 1.85 in a plane measured parallel to the surface upon which the structures are disposed. In another embodiment, the fractal dimensions can have fractional powers of about 1.00 to about 3.00, specifically about 1.25 to about 2.25, more specifically about 1.35 to about 1.85 in a plane measured perpendicular to the surface upon which the structures are disposed.

In yet another embodiment, the fractals can be mass fractals. The fractal dimensions can have fractional powers of about 3.00 to about 4.00, specifically about 3.25 to about 3.95, more specifically about 3.35 to about 3.85 in a plane measured perpendicular to the surface upon which the structures are disposed.

In another embodiment, the structures may have multiple fractal dimensions in a direction parallel to the surface upon which the structures are disposed. The spaced structures may be arranged to have 2 or more fractal dimensions, specifically 3 or more dimensions, specifically 4 or more dimensions in a direction parallel to the surface upon which the structures are disposed.

In yet another embodiment, the spaced structures may have multiple fractal dimensions in a direction perpendicular to the surface upon which the structures are disposed. The spaced structures may be arranged to have 2 or more fractal dimensions, specifically 3 or more dimensions, specifically 4 or more dimensions in a direction parallel to the surface upon which the structures are disposed.

Figure 2:
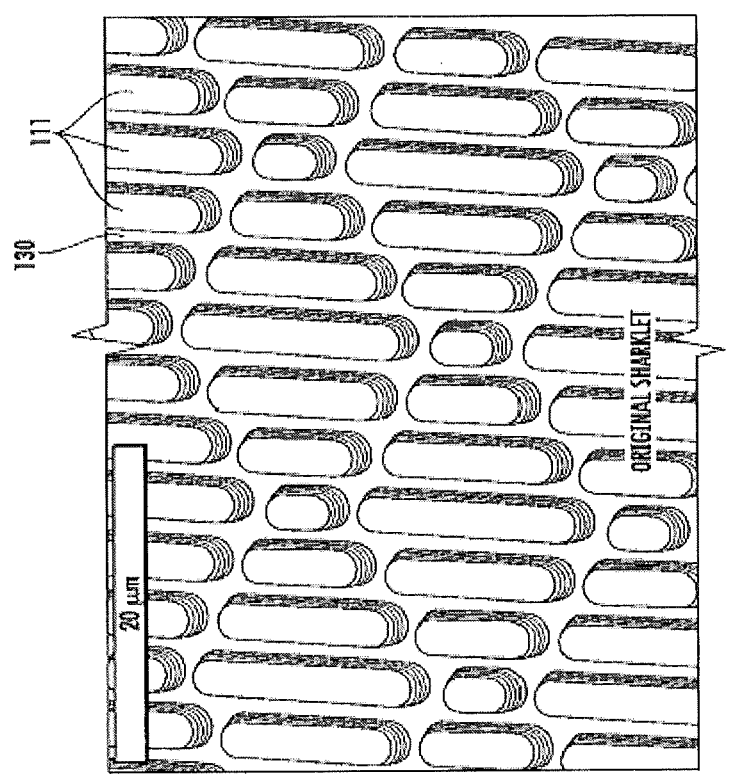
FIG. 2 is a substrate having a pattern upon which a polymer is disposed.

In one embodiment, depicted in the FIG. 2, the textured substrate comprises a plurality of structures disposed upon a surface of the substrate or projected into the surface to form a pattern. In another embodiment, the pattern comprises structures that have a tortuous path disposed between them. The tortuous path may be represented by a sinusoidal function.

In one embodiment, the substrate comprises a plurality of spaced structures in the form of a pattern. The spaced structures in the pattern may be arranged in a plurality of groupings. Each pattern can contain groupings of such structures that form repeat units, i.e., they can be translated laterally across the substrate. The structures within a grouping can be spaced apart at an average distance of about 1 nanometer to about 500 micrometers with each structure having a surface that is substantially parallel to a surface on a neighboring structure. Each structure is separated from its neighboring structure and the groupings of structures being arranged with respect to one another so as to define a tortuous pathway. In another embodiment, a tangent to the tortuous pathway intersects with at least one spaced structures that is part of the grouping. In yet another embodiment, the spaced structures are different from each nearest neighbor and not in contact with the nearest neighbor. In yet another embodiment, the spaced structures are different from each nearest neighbor and are in contact with the nearest neighbor. The tortuous path distinguishes one pattern from another.

The number of features in a given pattern can be odd or even. In one embodiment, if the total number of features in a given pattern are equal to an odd number, then the number of shared features are generally equal to an odd number. In another embodiment, if the total number of features in a given pattern are equal to an even number, then the number of features in the given pattern are equal to an even number.

The substrate can be functionalized with reactive groups prior to polymerization. The reactive groups facilitate the reacting of the polymers having a molecular weight of about 2,000 to about 5,000 g/mole to the substrate.

Exemplary reactive groups that may be used to functionalize surface are silanes, carboxylic acid groups, amines, vinyl groups, epoxide groups, and the like.

Examples of silanes are vinyl functional silanes, amino functional silanes, epoxy functional silanes, phenyl functional silanes, or the like, or a combination comprising at least one of the foregoing coupling agents.

Examples of vinyl functional silanes are vinyltriethoxysilane (VTMS) vinyltriethoxysilane (VTES), diethoxy(methyl)vinylsilane, ethoxy(dimethyl)vinylsilane, triacetoxy(vinyl)silane, tris(2-methoxyethoxy)vinylsilane, or the like, or combinations comprising at least one of the foregoing.

Examples of amino functional silanes are 3-aminopropyltriethoxysilane, 3-aminopropyltrmiethoxysilane, gamma-aminopropyltriethoxysilane, gamma-aminopropyltrimethoxysilane, 1,3-bis(3-aminopropyl)-tetramethyldisiloxane, N-(3-trimethoxysilylproyl)-ethylenediamine, 3-(N-methylamino)propyltrimethoxysilane, 3-(N-ethylamino)propyltrimethoxysilane, or the like, or a combination comprising at least one of the foregoing amino functional silanes.

Examples of epoxy functional silanes are 3-glycidoxypropyltrimethoxysilane, 3-glycidoxypropyltriethoxysilane, 3-glycidoxypropyldimethoxysilane, 3-glycidoxypropyldiethoxysilane, 3-glycidoxypropyldimethylmethoxysilane, 2-(3,4-epoxycyclohexyl)-ethyltriemethoxysilane, or the like, or a combination comprising at least one of the foregoing epoxy functional silanes.

Examples of phenyl functional silanes are diphenyldichlorosilane, triphenylchlorosilane, phenyltrichlorosilane, dimethylphenylsilane, diphenylmethylsilane, (thio)phenoxyphenylsilane, trimethoxysilylphenyltrichlorosilane, or the like, or a combination comprising at least one of the foregoing amino functional silanes.

Other silanes that may be used include hydrocarbon silane ($C_nH_{2n+1}$—$Si(OR)_3$) and fluorocarbon silane ($C_{3-10}F_n$—$CH_2CH_2$—$Si(OR)_3$).

Examples of compounds having carboxylic acid groups include monocarboxylic acids comprising an unsaturated double bond such as (meth)acrylic acid, 2-carboxylethyl acrylate, crotonic acid, vinyl acetate, monovinyl adipate, monovinyl sebacate, monomethyl itaconate, monomethyl maleate, monomethyl fumarate, mono-[2-(meth)acryloyloxyethyl]succinate, mono-[2-(meth)acryloyloxyethyl]phthalate, mono-[2-(meth)acryloyloxyethyl]hexahydrophthalate; dicarboxylic acids which comprise an unsaturated double bond such as itaconic acid, maleic acid and fumaric acid; alkyl(meth)acrylates such as methyl(meth)acrylate, ethyl(meth)acrylate, n-propyl(meth)acrylate, n-butyl(meth)acrylate, iso-butyl(meth)acrylate, tert-butyl(meth)acrylate, 2-ethyl hexyl(meth)acrylate, lauryl(meth)acrylate, octadecyl(meth)acrylate, docosanyl(meth)acrylate, cyclopentyl(meth)acrylate, cyclohexyl(meth)acrylate, bornyl(meth)acrylate, isobornyl(meth)acrylate, dicyclopentanyl(meth)acrylate, cycloalkyl alkyl(meth)acrylates, or the like, or a combination comprising at least one of the foregoing compounds.

Examples of compounds having epoxide groups include 1,2,7,8-diepoxyoctane, N,N-diglycidyl-4-glycidyloxyaniline, 4,4'-methylenebis(N,N-diglycidyl)aniline, triphenylolmethyl triglycidyl ether, triglycidyl isocyanurate, bisphenol-A diglycidyl ether, 2-(3,4-epoxycyclohexyl)ethyltrimethoxysilane, phenol formaldehyde-epoxides, 1,2,7,8-diepoxyoctane, N,N-diglycidyl-4-glycidyloxyaniline, 4,4'-methylenebis(N,N-diglycidyl)aniline, tris(2,3-epoxypropyl) isocyanate, triphenylolmethyl triglycidyl ether, triglycidyl isocyanurate, bisphenol-A diglycidyl ether, or the like, or a combination comprising at least one of the foregoing epoxy compounds.

The substrate can have a number average particle size of about 1 nanometers to about several hundreds of meters depending upon the application. In one embodiment, when the substrate is used for forming particles that are used in biological applications, the number average particle size for the substrate can be about 1 nanometers to about 100 nanometers, specifically about 10 to about 70 nanometers, and more specifically about 20 to about 50 nanometers. When the substrate is the hull of a ship or the outside of a house, the substrate may be about 10 square meters to about 1000 square meters. Thus the substrate can be used in applications that vary widely in size.

The polymers that have a molecular weight of about 2,000 to about 5,000 g/mole (hereinafter the "polymer") that are disposed on the substrate provide the surface of the substrate with an ability to control bioadhesion. The polymer may be derived by the polymerization of a single repeat unit or may be derived from the polymerization of a plurality of monomers having a different chemical structures. In one embodiment, the polymer is derived by the polymerization of two or more monomers having different chemical structures. In yet another embodiment, the polymer is derived by the polymerization of three or more monomers having different chemical structures. In yet another embodiment, the polymer is derived by the polymerization of four or more monomers having different chemical structures.

The polymer may be derived from diols, diacids, diesters, molecules containing ethylenic unsaturation such as acrylates, methacrylates, acrylamides, methacrylamides, styrene, substituted styrenes, vinyl naphthalene, substituted vinyl naphthalenes, and other vinyl derivatives, amides, esters, olefins, carboxylic acids, acyl chlorides (acid chlorides), acid anhydrides, carboxylic acids, silicones, and the like.

Diols may be aliphatic diols, aromatic diols, cycloaliphatic diols, or combinations comprising at least one of the foregoing diols. Examples of diols are 1,2-ethylene glycol, 1,2- and 1,3-propylene glycol, 1,4-butylene glycol, 2,2-dimethyl-1,3-propane diol, 2-ethyl-2-methyl-1,3-propane diol, 1,3- and 1,5-pentane diol, dipropylene glycol, 2-methyl-1,5-pentane diol, 1,6-hexane diol, 2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hyroxyethyl)-bisphenol A, bis(2-hyroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene, or the like, or a combination comprising at least one of the foregoing diols.

Examples of diacids or diesters are oxalic acid, terephthalic acid, phthalic acid, isophthalic acid, fumaric acid, maleic acid, itaconic acid, succinic acid, succinic anhydride, dodecylsuccinic acid, dodecylsuccinic anhydride, glutaric acid, glutaric anhydride, adipic acid, pimelic acid, suberic acid, azelic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, succinic acid, glutaric acid, adipic acid, suberic acid, azelaic acid, sebacic acid, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof; an alkali sulfo-organic diacid such as the sodio, lithio or potassio salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, 5-sulfo-isophthalic acid, dialkyl-sulfo-terephthalate, sulfoethanediol, 2-sulfopropanediol, 2-sulfobutanediol, 3-sulfopentanediol, 2-sulfohexanediol, 3-sulfo-2-methylpentanediol, 2-sulfo-3,3-dimethylpentanediol, sulfo-p-hydroxybenzoic acid, N,N-bis(2-hydroxyethyl)-2-amino ethane sulfonate, or the like, or a combination comprising at least one of the foregoing diacids or diesters.

Examples of olefins are ethylene, propylene, 1-butene, 1-pentene, 1-hexene, 1-octene, 1-decene, 1-do decene, 1-tetradecene, 1-hexadecane, 1-octadecene, 1-eicocene, derivatives of these α-olefins; cycloolefins, cyclobutene, cyclopentene, cyclohexene, cyclooctene, 3a,5,6,7a-tetrahydro-4,7-methano-1H-indene, derivatives of these cycloolefins; non-conjugated dienes, 1,4-hexadiene, 4-methyl-1,4-hexadiene, 5-methyl-1,4-hexadiene, 1,7-octadiene, derivatives of non-conjugated dienes, or the like, or a combination comprising at least one of the foregoing olefins.

Examples of molecules comprising ethylenic unsaturation include acrylic acid esters and methacrylic acid esters such as alkyl acrylate, alkyl methacrylate, siloxanyl acrylate, siloxanyl methacrylate, fluoroalkyl acrylate, fluoroalkyl methacrylate, acrylic acid, methyl acrylate, ethyl acrylate, n-butyl acrylate, phenyl acrylate, 2-hydroxy-ethyl acrylate, 2-hydroxypropyl acrylate, methacrylic acid, methyl methacrylate, ethyl methacrylate, n-butyl methacrylate, 2-ethylhexyl methacrylate, isobornyl methacrylate, benzyl methacrylate, phenyl methacrylate, 2-hydroxyethyl methacrylate, 2-hydroxypropyl methacrylate, 2-hydroxybutyl methacrylate, ethylene glycol diacrylate, ethylene glycol dimethacrylate, diethylene glycol diacrylate, diethylene glycol dimethacrylate, triethylene glycol diacrylate, triethylene glycol dimethacrylate, propylene glycol diacrylate, propylene glycol dimethacrylate, trimethylolpropane triacrylate, trimethylol-propane trimethacrylate, pentaerythritol triacrylate, pentaerythritol trimethacrylate, 1,4-butanediol diacrylate, 1,4-butanediol dimethacrylate, 1,6-hexanediol diacrylate, 1,6-hexanediol dimethacrylate, glycerol diacrylate, glycerol dimethacrylate, divinylbenzene-diallyl phthalate, diethylene glycol bisallylcarbonate, 2-methacryloyloxyethylsuccinic acid, fumaric acid and its esters, methacrylonitrile, N,N-dimethyl-acrylamide, N-vinyl-2-pyrrolidone, 2-methacryloyloxyethylphosphorylcho line, hydroxyalkyl acrylate, hydroxyalkyl methacrylate, polyethylene glycol acrylate, polyethylene glycol methacrylate, acrylic acid ester of a polyhydric alcohol, methacrylic acid ester of a polyhydric alcohol, vinyl acrylate, vinyl methacrylate, or the like, or a combination comprising at least one of the foregoing molecules comprising ethylenic unsaturation. In an exemplary embodiment, the Polymer is a copolymer of a plurality of acrylates. The acrylates are acrylic acid (AA), acrylamide (AAm), methyl acrylate (MA) and acrylamido-2-methyl-propane-sulfonate (AMPS).

Exemplary vinyl aromatic monomers generally contain from 8 to 20 carbon atoms. Examples of vinyl aromatic monomers include styrene, 2-methylstyrene, 3-methylstyrene, 4-methylstyrene, α-methyl styrene, 2,4-dimethylstyrene, 2,4-diisopropylstyrene, 4-tert-butylstyrene, 1-vinylnaphthalene, 2-vinylnaphthalene, α-methylstyrene, 4-phenylstyrene, 3-methylstyrene, or the like, or a combination comprising at least one of the foregoing molecules comprising vinyl aromatic monomers.

In one method, in one manner of manufacturing the article, the reactive groups (e.g., silanes, carboxylic acid groups, amines, vinyl groups, epoxy groups, and the like) are disposed upon the substrate. The polymer (which is synthesized separately) is then disposed upon the substrate. In one embodiment, the polymer (i.e., polymer having a molecular weight of about 2,000 to about 5,000 g/mole). In another embodiment, the substrate with the reactive groups disposed thereon is reacted with various monomers contained in a reaction mixture. The monomers react with the substrate and with themselves to form the polymer. Initiators, molecular weight control additives, and the like, may be added to the reaction mixture.

The polymer may be synthesized by addition polymerization, condensation polymerization, ionic polymerization, emulsion polymerization, free radical polymerization or via combinations of different types of polymerizations.

Examples of the polymer (that is synthesized separately) are poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), poly(styrene-butyl acrylate-acrylonitrile-acrylic acid), poly(styrene-butadiene-β-carboxyethyl acrylate), poly(styrene-butadiene-acrylonitrile-β-carboxyethyl acrylate), poly(styrene-butyl acrylate-f3-carboxyethyl acrylate), and poly(styrene-butyl acrylate-acrylonitrile-β-carboxyethyl acrylate).

Other polymers that can be disposed upon the substrate 100 are listed above. Copolymers of these polymers can also be disposed upon the substrate 100.

As noted above, the polymers can be a copolymer comprising two or more copolymers. In one embodiment, the copolymer can comprise a first monomer, a second monomer, a third monomer and a fourth monomer. In one embodiment, the copolymer can comprise about 1 to about 60 wt % of the first monomer, about 1 to about 60 wt % of the second monomer, about 1 to about 60 wt % of the third monomer and about 1 to about 60 wt % of the fourth monomer.

In one embodiment, the range of weight ratios of the first monomer to other monomers in the copolymer is about 1:10 to about 10:1, specifically about 5:1 to about 1:5. In another embodiment, the range of weight ratios of the second monomer to other monomers in the copolymer is 1:10 to 10:1, specifically about 5:1 to about 1:5. In yet another embodiment, the range of weight ratios of the third monomer to other monomers in the copolymer is 1:10 to 10:1, specifically about 5:1 to about 1:5. In yet another embodiment, the range of weight ratios of the fourth monomer to other monomers in the copolymer is 1:10 to 10:1, specifically about 5:1 to about 1:5.

In an exemplary embodiment, the first monomer is an acrylic acid (AA), the second monomer is acrylamide (AAm), the third monomer is methyl acrylate (MA) and the fourth monomer is acrylamido-2-methyl-propanesulfonate (AMPS).

In one embodiment, the copolymer can contain the acrylic acid in an amount of about 3 to about 10 wt %, about 10 wt % to about 20 wt %, about 20 wt % to about 30 wt %, about 25 wt % to about 35 wt %, about 35 wt % to about 40 wt %, about 40 wt % to about 45 wt %, about 45 wt % to about 50 wt %, about 50 to about 55 wt %, about 55 to about 60 wt %, about 60 to about 65 wt %, about 65 to about 70 wt %, about 70 to about 75 wt %, about 75 to about 80 wt %, and about 80 to about 90 wt %, based on the total weight of the copolymer.

In another embodiment, the copolymer can contain the acrylamide in an amount of about 3 to about 10 wt %, about 10 wt % to about 20 wt %, about 20 wt % to about 30 wt %, about 25 wt % to about 35 wt %, about 35 wt % to about 40 wt %, about 40 wt % to about 45 wt %, about 45 wt % to about 50 wt %, about 50 to about 55 wt %, about 55 to about 60 wt %, about 60 to about 65 wt %, about 65 to about 70 wt %, about 70 to about 75 wt %, about 75 to about 80 wt %, and about 80 to about 90 wt %, based on the total weight of the copolymer.

In yet another embodiment, the copolymer can contain the methyl acrylate in an amount of about 3 to about 10 wt %, about 10 wt % to about 20 wt %, about 20 wt % to about 30 wt %, about 25 wt % to about 35 wt %, about 35 wt % to about 40 wt %, about 40 wt % to about 45 wt %, about 45 wt % to about 50 wt %, about 50 to about 55 wt %, about 55 to about 60 wt %, about 60 to about 65 wt %, about 65 to about 70 wt %, about 70 to about 75 wt %, about 75 to about 80 wt %, and about 80 to about 90 wt %, based on the total weight of the copolymer.

In yet another embodiment, the copolymer can contain the acrylamido-2-methyl-propanesulfonate in an amount of about 3 to about 10 wt %, about 10 wt % to about 20 wt %, about 20 wt % to about 30 wt %, about 25 wt % to about 35 wt %, about 35 wt % to about 40 wt %, about 40 wt % to about 45 wt %, about 45 wt % to about 50 wt %, about 50 to about 55 wt %, about 55 to about 60 wt %, about 60 to about 65 wt %, about 65 to about 70 wt %, about 70 to about 75 wt %, about 75 to about 80 wt %, and about 80 to about 90 wt %, based on the total weight of the copolymer.

It is to be noted that all ranges disclosed herein are interchangeable and that all ranges are inclusive of the numerical endpoints of the range.

The article comprising the substrate with the polymers having a molecular weight of about 2,000 g/mole to 5,000 g/mole disposed thereon are advantageous in that they can be used to control bioadhesion. These articles show a reduction of greater than or equal to about 50% when subjected to biosettlement, specifically greater than or equal to about 60% when subjected to biosettlement, specifically greater than or equal to about 70% when subjected to biosettlement, specifically greater than or equal to about 80% when subjected to biosettlement, and more specifically greater than or equal to about 90% when subjected to biosettlement when compared with other comparable substrates that do not contain polymers having a molecular weight of about 2,000 g/mole to 5,000 g/mole disposed thereon.

It should be understood that the Examples described below are provided for illustrative purposes only and do not in any way limit the scope of the invention.

EXAMPLES

Example 1

This example demonstrates the effectiveness of the -olymers in resisting bioadhesion.

Microscope glass slides (76 mm×25 mm×1 mm), hydrogen peroxide (50 wt. % solution in $H_2O$) and hydrochloric acid (12.1M) were purchased from Fisher. Silastic® T-2 resin and curing agent was purchased from Dow-Corning Corporation. 3-(mercaptopropyl)trimethoxysilane (MTS), acrylic acid (99 wt %) (AA), acrylic amide (>99 wt %) (AAm), methyl acrylate (99 wt %) (MA), 2-acrylamido-2-methyl-1-propanesulfonic acid (99 wt %) (AMPS), potassium persulfate (>99 wt %) and sodium hydroxide were purchased from Aldrich. Nanopure deionized (DI) water with resistivity greater than 18 megaohms-centimeter (MΩ-cm) was produced in-house.

The copolymers provided for the study were synthesized from a mixture of acrylic acid (AA), acrylamide (AAm), methyl acrylate (MA) and 2-acrylamido-2-methyl-propanesulfonate (AMPS) in aqueous solution, which formed a poly (AA-co-AAm-co-MA-co-AMPS). The 4 digit numbers of the sample name refer to the monomer ratios of AA, AAm, MA and AMPS before polymerization. For example, sample name "3214" refers to 30% AA, 20% AAm, 10% MA and 40% AMPS.

Microscope glass slides were flame treated with a Bunsen burner 3 to 4 times each, let cool and were placed in a glass coplin jar. An acid peroxide solution with [HCl]=4.7N and $[H_2O_2]$=8.4N was prepared and transferred to the jar. The reaction was carried out in the sonicator (Brason 3210) for one hour. The slides were washed with about 50 milliliters ("ml") DI water and stored in DI water before silanization. A 5% (v/v) MTS/toluene solution was prepared and added into a staining dish with the slides sitting in the slide rack. The solution was well-mixed with the slides and the reaction lasted two hours under $N_2$ at 25° C. Each of the slides was rinsed with ~10 ml toluene and then cured in a 100° C. vacuum oven for 30 minutes. Each of the slides was then stored in a centrifuge tube with methanol at 4° C. until prior to grafting A monomer aqueous solution was prepared using 200 millimolar (mmol) total amounts of AA, AAm, MA and AMPS monomers, 0.27 mmol potassium persulfate, 160 ml DI water. A stoichiometrically equivalent amount of sodium hydroxide to the amount of AA and AMPS was added into the solution. The solution was transferred into a staining dish with slides sitting in the rack and the reaction was carried out in a 60° C. water bath for 30 minutes. After reaction, the slides were washed with copious amounts of DI water, blow-dried with $N_2$ gas and stored in new centrifuge tubes with DI water for at least 24 hours allowing for leaching of some unbounded polymers.

Sessile drop water contact angle and dynamic contact angle were measured using a Rame Hart model 500 goniometer. For sessile drop contact angle measurement, the volume of each drop was 5 μL. The angle was recorded when the drop reached equilibrium. Ten drops were disposed on each surface. For dynamic contact angle measurement, the advancing contact angle was to measure the maximum angle with a 3 μL initial droplet and 0.1 μL increments while the receding contact angle was to measure the minimum angle when the liquid was removed at 0.1 μL decrements from the 3 μL initial droplet. Five spots were performed on each type of surface.

For surface energy measurement, both the Owens-Wendt-Kaelble (OWK) approach and Lifshitz-van der Waals acid-base (LW-AB) model were adopted using two polar liquids, DI water (WT) and glycerol (GL), and one non-polar liquid, diiodomethane (DM) with the corresponsive surface tension $\gamma_L$=72.8, 64.0 and 50.8 mN/m. The polar ($\gamma_S^P$) and dispersion ($\gamma_S^d$) components of the surface energies of S-MTS and copolymer-grafted slides were determined by equation 1 and equation 2.

$$\gamma_L = \frac{2\left(\sqrt{\gamma_S^d \gamma_L^d} + \sqrt{\gamma_S^P \gamma_L^P}\right)}{1 + \cos\theta} \quad (1)$$

$$\gamma_S = \gamma_s^p + \gamma_p^d \quad (2)$$

The parameters of $\gamma_L$, $\gamma_L^d$ and $\gamma_L^P$ refer to the total surface tension, dispersion and polar components of the probe liquid. The surface energies ($\gamma_S$) of the modified surfaces are the sum of polar ($\gamma_s^P$) and dispersion ($\gamma_s^d$) components of the solid.

The total surface energy ($\gamma_S$) of a solid is contributed from the electromagnetic interactions between the liquid and solid, termed as Lifshitz-van der Waals ($\gamma_s^{LW}$), and "proton-sharing" between electron acceptor and electron donor, termed as acid-base interactions ($\gamma_s^{AB}$), as shown in equations (3)-(5). The $\gamma_s^{LW}$, $\gamma_s^+$ (Lewis acid parameter) and $\gamma_s^-$ (Lewis base parameter) could be calculated by the three equations after contact angle measurements of three different test liquids, including one non-polar and two polar on the copolymer-grafted surfaces.

$$\gamma_s = \gamma_s^{LW} + \gamma_s^{AB} \quad (3)$$

$$\gamma_L(1+\cos\theta) = 2(\sqrt{\gamma_S^{LW}\gamma_L^{LW}} + \sqrt{\gamma_S^+\gamma_L^-} + \sqrt{\gamma_S^-\gamma_L^+}) \quad (4)$$

$$\gamma_s^{AB} = 2\sqrt{\gamma_S^+\gamma_S^-} \quad (5)$$

XPS Measurement

Xray photoelectron spectroscopy (XPS) was used to analyze the chemical composition of MTS-coupled and poly (AA-co-AAm-co-MA-co-AMPS)-grafted surfaces. The Perkin-Elmer PHI 5100 ESCA system with the Mg Kα X-ray source was performed to acquire both survey and multiplex (C1s and S2p) spectra. The samples were analyzed at 15 degree take-off angle under high vacuum (~2~$10^{-9}$ Torr). Both analyses and curve fitting were performed on Aguer-Scan 3.2 (RBD instrument). The 10% Gaussian-Lorentzian band type was chosen for the curve fitting.

Ulva Linza Zoospore Settlement and Fouling Release Assays

Six replicates of each polymer-grafted surface were prepared. The flame-treated glass slide and Silastic T2 PDMSe on the slide were served as standards in this experiment. Among the six replicates of each sample, three replicates were assayed for Ulva spore settlement, while the other three replicates for fouling release test. The assays were using the standardized settlement and release protocol. In general, samples were immersed in artificial seawater (ASW) (Instant Ocean®) for 2 hours before the assay. An amount of 10 ml of spore solution with a concentration of $1.5 \times 10^6$ spores/ml was added into an assay dish and incubated in the dark for 45 minutes at 20° C. The samples were gently rinsed with ASW to remove unattached spores and fixed with 2% glutaraldehyde in seawater for 10 minutes before counting spores. For release assays, a turbulent flow apparatus providing 50 MPa shear stress was used to release the spores on the unfixed slides. The number of the spores still on the slides was counted. The mean settlement densities and percentage of spore removal will be compared using the analysis of variance method.

Chemical Composition of Modified Surfaces

The sample code of each poly(AA-co-AAm-co-MA-co-AMPS) grafted slide with initial monomers (AA, AAm, MA, AMPS) compositions before polymerization and the final surface compositions are listed in Table 1. The four numbers of each sample code was correspondent to the initial mole ratio of AA, AAm, MA and AMPS. The XPS composition and high resolution data of the S-MTS and five copolymer samples were listed in Table 2. For the S-MTS, the high resolution spectrum of C1s showed two distinct peaks at 285.1 eV (71.4%) and 286.8 eV (28.6%) by curve fitting. The 285.1 eV peak was attributed to C—C(285.0 eV), C—S(285.4 eV) and C—Si(284.8 eV) in the MTS structure due to their similar values. The other peak 286.8 eV referred to C—O bond which was formed from the unsilanized methoxy group. By calculating the ratio (71.4:28.6=3:x, x=1.2), there was approximately one unsilanized methoxy on each MTS molecule. Also, the S2p spectrum of S-MTS showed two peaks with binding energy of 163.7 eV and 167.9 eV, corresponding to the thiol groups and oxidized sulfur groups respectively in the MTS. It's known that the thiol group would oxidize with time in the air. Our previous experimental data showed that there was approximately 18% sulfur oxidized when exposed to air 5 hours at 25° C. Therefore, in order to reduce the possibility of oxidization, one S-MTS was characterized by XPS right after it was synthesized and the others were stored in the methanol at 4° C. no longer than 24 hours before further grafting. The result showed only 2.1% oxidized sulfur in the MTS, which was relatively lower than 18%. The approximate time span was 20 minutes for sample preparation.

The composition of polymers in each of the five copolymer samples was determined by the calculation of both the element composition and high resolution data. The sulfur element appeared two peaks in the S2p spectrum in all the five samples. The peaks with binding energy ~163.8 eV and ~168.3 eV referred to the thiol group in the MTS and —$SO_3$— in the PAMPS. If the sample 3421 was considered for example, the calculation is as follows. The amount of PAMPS was determined by the amount of total —$SO_3$— subtracted by the amount of oxidized sulfur in the MTS. The amount of oxidized sulfur in the MTS could be estimated by the sample 3340 (no PAMPS) under the assumption that the MTS on the five samples has similar oxidization rates. This assumption was reasonable since they were synthesized by the same protocol and the MTS concentration was relatively low compared to the grafted copolymer. Thus the amount of PAMPS was calculated by (1.4×37.4%)−(0.3×29.7%), which was 0.43. The amount of PAA could be determined by the sodium element. A stoichiometrically equivalent amount of sodium chloride was added into the aqueous solution to neutralize the acidic solution resulted from AA and AMPS monomers prior to polymerization. Since there was no sodium element detected in the S-MTS, we could assume the total amount of sodium was from PAA and PAMPS. Therefore, the amount of PAA was 1.7−0.43=1.27. The amount of PAAm could be obtained by subtracting the amount of nitrogen by the amount of PAMPS, which was 2.0−0.43=1.57. Finally, the amount of PMA was determined by the total amount of carbonyl groups contributed from all the four components. According to the literature, the binding energy of the carbon on the carbonyl group may slightly change due to different chemical environment. The binding energy was 288.0 eV for the carbon on amine group and 288.6 eV or 289 eV for the carbon on the ester group. Because the binding energy difference was less than 1.0 or 0.6 eV, it did have difficulty to differentiate both specific values during curve fitting. Moreover, the surface charges on the sample during the analysis may occur resulting in a shift of the spectrum to a higher binding energy. An error of less than 0.3 eV was usually inevitable after shift correction. Therefore, we fitted both types of carbonyl groups into one peak, which was ~288.4 eV. The amount of PMA could be then calculated as 34.8×11.1%−1.27−1.57−0.43=0.60. The ratio of PAA:PAAm:PMA:PAMPS became 33:41:15:11. The same calculation and assumptions were applied for the other four samples and the final ratios were listed in Table 1.

Contact Angle Measurement

The synthesis included three steps, which were hydrolysis of glass slide, silanization of MTS on the slide surface and copolymer formation in solution accompanying with polymer chains transferring to glass surface, as shown in Scheme 1A, B and C. The sessile drop contact angle measurement of hydrolyzed glass slide showed an angle less than 5°, suggesting a high coverage of hydroxyl groups on the glass surface. The high hydroxyl covered surface also promoted the probability of MTS bonded to glass surface during silanization. The contact angle measurement of MTS-coupled glass slide was 62.6±2.0°, which suggested high MTS coverage on the surface and was in agreement with the reported value in Cras' group. The advancing and receding angle of the S-MTS was 67.1±1.9° and 37.0±0.6°, respectively, with a hysteresis value of approximately 30°. Although the value of advancing angle was in agreement with the reported value by Schmidt's group, the receding angle value was 10° lower. This variation was most likely due to the different acid treatment and operation condition during the silanization which influenced the surface coverage and roughness, leading to a change on the hysteresis.

The grafted poly(AA-co-AAm-co-MA-co-AMPS) glass substrates were characterized by goniometer as well. All the five samples exhibited different static water contact angle values, shown in Table 3, with significant variation ($\alpha=0.05$) between any of two, reflecting the different chemical compositions of each grafted surface. In order to examine the rationality of the contact angles values of each sample, it is important to know the contact angle values of the homopolymer-grafted glass surface. It has been shown in the previous report that using the same grafting protocol described in this paper, PAMPS-grafted surface had the lowest contact angle (19.1°±6.7°) compared to PAA-grafted surface (42.3°±4.9°), PAAm-grafted surface (47.6°±6.0°) and PMA-grafted surface (62.5°±2.4°). By looking upon the structures of four homopolymers, PAMPS has both amido groups and sulfonic groups capable of forming hydrogen bonding and ionic interaction with water, attributing to the low contact angle value. PAA and PAAm have carboxylic acid groups and amine groups respectively, exhibiting the medium contact angle values due to the ability to form hydrogen bonding with water. In contrast, PMA has only ester groups which performs its less hydrophilic nature. By observation of the sessile drop contact angle values of the five samples, we could find a trend correlated to the initial monomers composition or final surface composition. For the samples with higher MA composition, i.e. 3340 and 3241, exhibited higher contact angle values of 51.3±6.4°) and 46.4±5.4°). The lowest contact angle was performed on sample 3214) (30.5±3.5°), which had highest content of AMPS and lowest content MA.

The dynamic contact angles, or advancing and receding contact angles, summarized in Table 2 of the MTS-coupled slide and five copolymer samples were determined by sessile drop method using DI water as a test liquid. Among the five samples, sample 3340 had the highest advancing contact angle ($\theta_A=63.4\pm0.7°$), indicating the least hydrophilic nature among the five, which was in agreement with the result observed in static sessile drop contact angle. Contrary to sample 3340, sample 3214 had the lowest advancing contact angle ($\theta_a$=38.0±2.0°) due to its highly hydrophilic characteristic. The same trend was observed for the receding contact angles ($\theta_r$) on the five samples, which could be explained in the same manner. The dynamic contact angle hysteresis ($\theta_a$–$\theta_r$), summarized in Table 2, reflected the significance of the surface reorganization. The hysteresis of the five samples ranged from 27.0° to 37.1°, which occurred due to short region segment rotations of different polymer components in the same copolymer chain. The various levels of hydrophilicity of the components in the copolymers played a driving force for local chain rotations to reach an equilibrium state with the water/air interface. A comparable acrylate copolymer to our system was done by Schmidt's group. They synthesized a copolymer by cross-linking poly(heptadecafluorodecyl acrylate)-co-PAA with poly(2-isopropenyl-2-oxazoline)-block-poly(methyl methacrylate). The contact angle hysteresis in their copolymers were 20-41 degrees depending on different mixing ratios. If we further compare to other amphiphilic polymers used for marine antifouling, such as fluoropolymer-co-ethylene glycol, the hysteresis formed by the acrylate copolymers in our system were in a similar range.

It is believed that the heterogeneity in the chemical composition surface and surface roughness are the two main factors affecting the contact angle hysteresis. The chemical compositions of the five copolymer-grafted surfaces did differentiate with each other in terms of the finial ratios of each component in the copolymer (will be discussed in XPS part). It has been recently reported that the contact angle hysteresis increases with an increase of the roughness when a water drop is at Wenzel state while at the Cassie state ($\theta$>150°), there is no correlation to the roughness but strongly to the solid fraction. The roughness of the copolymer-coated surface by the same synthesis method has been investigated in our group using the atomic force microscopy (AFM). The result showed that the root mean square roughness of copolymer-grafted surface was ~6 nm when tested under dry condition compared to the roughness of homopolymer-grafted (i.e. PAA, PAAm, PMA and PAMPS) surfaces (~4 nm) and MTS-coupled slide (~2 nm). The higher roughness in copolymer-grafted surface was caused by the surface energy differences between each polymer component. Components with similar surface energies tend to mingle in one phase while those with different surface energies tend to create phase segregations. Furthermore, it has been shown that the solvent penetration was a factor to influence the contact angle hysteresis. The base material of the modified surface was a relatively dense silicate glass. There should only be limited influence on the hysteresis.

Surface Energy Measurement

The surface energies along with the polar, dispersive, Lifshitz-van der Waals and acid-base interaction components of MTS-coupled surface and copolymer-grafted surfaces were determined by using Owens-Wendt-Kaelble (OWK, equation 1, 2) and Lifshitz-van der Waals acid-base (LW-AB, equation 3,4,5) approaches. In the OWK method, at least one polar liquid and one non-polar liquid were required to determine the polar and dispersive components of the tested surface by measuring the contact angle. In order to obtain more accurate surface energy values, pairs of polar non-polar liquids, water-diiodomethane (WT-DM) and glycerol-diiodomethane (GL-DM), were tested and the surface energy was taken the average. On the other hand, the LW-AB model developed by van Oss et al. is more complicated, which further resolves the "proton-sharing" interactions between electron acceptor and donor, which are known as Lewis acid and Lewis base, respectively. Two polar and one non-polar test liquids with known $\gamma_L^{LW}$, $\gamma_L^+$, and $\gamma_L^-$ values could be substituted into equation 4 to create three equations that the other three unknown $\gamma_S^{LW}$, $\gamma_S^-$, and $\gamma_S^-$ were then calculated. In both approaches water and glycerol were served as polar liquids while diiodomethane was served as non-polar liquid. Static sessile drop contact angles of each modified surface were used in this study and the values were tabulated in Table 3.

The surface tension ($\gamma_L$) of test liquids and their correspondent components, such as polar ($\gamma_L^P$), dispersion ($\gamma_L^d$), Lifshitz-van der Waals ($\gamma_L^{LW}$), Lewis acid ($\gamma_L^+$), Lewis base ($\gamma_L^-$) and acid-base interaction ($\gamma_L^{AB}$) are listed in Table 4.

The calculated surface energies ($\gamma_S$), polar and dispersion component ($\gamma_S^P$ and $\gamma_S^d$) of S-MTS and copolymer-grafted samples by OWK method were given in Table 5. The surface energy of S-MTS was 48.3 mJ/m², which had relatively low polar component (13.6 mJ/m²) compared to other five acrylate-coated surface. Among the five copolymer-grafted surfaces, sample 3340 had the lowest surface energy of 53.1 mJ/m² while sample 3214 had the highest of 62.6 mJ/m². Since the dispersive component values of five copolymer-grafted surfaces were similar (31.1-35.4 mJ/m²), the value of polar component was likely to determine the total surface energy. This result matched what we have predicted since PAMPS, the most component in the sample 3214, has both the sulfonic groups and amido groups to form the ionic bonding and hydrogen bonding with polar liquid. On the contrary, sample 3340, which had no PAMPS but the most less hydrophilic PMA showed the least polar contribution to its surface energy.

The surface energies of S-MTS and copolymer-grafted samples calculated using LW-AB method in Table 6 showed similar result with those obtained from OWK method. The surface energies of the S-MTS and sample 3421, 3241, 3340, 3214 and 1423 were 49.1, 60.4, 57.6, 54.4, 62.1 and 59.3 mJ/m², respectively, and this result matched those determined by OWK method, which were 48.3, 60.8, 57.2, 53.1, 62.6 and 58.3 mJ/m². The deviation of the values determined from both methods was less than 2.4%. For all the five copolymer samples, the values of Lewis base component ($\gamma_S^-$) were higher than Lewis acid component ($\gamma_S^+$), indicating strong election-donating characteristic, in the overall structure. The electron-donating characteristic was presumably attributed to the oxygen atoms in carbonyl groups or acid groups and nitrogen atoms in amide or amido groups. The highest Lewis base component ($\gamma_S^-$) was 30.4 mJ/m² on the sample 3214 as it had more PAMPS and less PMA components in the structure while the lowest $\gamma_S^-$ 19.9 mJ/m² was on the sample 3340 as it had non PAMPS and more PMA components in the structure. Both Lewis base component ($\gamma_S^-$) and Lewis acid component ($\gamma_S^-$) affected the acid-base interaction parameters ($\gamma_S^{AB}$), which contributed to the total surface energy. The surface energies of the copolymer-grafted surfaces ranged from 53.1-62.6 mJ/m², which implied a possible route to tune the surface energy by changing the ratio of each acrylate component.

Graft Density of the Modified Surface

The graft densities of each modified surface were determined by carefully weighing the substrates before and after chemical treatments. The value of weight difference of each sample was divided by total glass surface area to determine the graft density. Each weight measurement was made right after vacuum dried (0.01 atm) the sample for 1 hour at 25° C. to remove the possible trapped solvent or moisture in the glass structure. Table 7 showed the weight and graft density of copolymers on sample 3421, 3241, 3340, 3214 and 1423. Each sample was weighed three times and taken the average for the calculation. The graft density was determined using the weight of copolymer on the surface divided by total slide (L: 7.62 cm, W: 2.54 cm, H: 0.1 cm) surface area. The graft densities of each sample ranged 8.1-12.4 μg/cm$^2$. The sample 3214 and 1423 had higher graft density because of the high molecular weight of AMPS. The molecular weight of AMPS is 207.3 g/mol, which is 2.8 times of AA (72.1 g/mol), AAm (71.1 g/mol) and 2.4 times of MA (86.1 g/mol). If we calculated the weight difference of each sample based on the ratios of each acrylate component analyzed by XPS, the weight difference measured by the balance is reasonable.

Zoospore Settlement and Release

Samples were soaked in DI water for 24 hours at 25° C. Leaching test was examined by UV spectrophotometer. The detection limit could reach as low as 1 ppm as tested on the machine. A standard copolymer was run and used to compare. The UV spectra of each sample were flat out the whole UV region, implying no leaching issue on these modified glass slides.

TABLE 1

Initial monomers (AA, AAm, MA, AMPS) compositions before polymerization and the final surface compositions of sample 3421, 3241, 3340, 3214 and 1423.

| | Initial composition (%) | | | | Final composition (%) | | | |
|---|---|---|---|---|---|---|---|---|
| Sample | AA | AAm | MA | AMPS | AA | AAm | MA | AMPS |
| 3421 | 30 | 40 | 20 | 10 | 33 | 41 | 15 | 11 |
| 3241 | 30 | 20 | 40 | 10 | 31 | 26 | 34 | 10 |
| 3340 | 30 | 30 | 40 | 0 | 29 | 32 | 39 | 0 |
| 3214 | 30 | 20 | 10 | 40 | 32 | 26 | 8 | 34 |
| 1423 | 10 | 40 | 20 | 30 | 11 | 44 | 15 | 30 |

TABLE 2

XPS composition and high resolution data of S-MTS, sample 3421, 3241, 3340, 3214 and 1423.

| | Elemental composition (%) | | | | | | High resolution data | | | |
| | | | | | | | C 1s | | S 2p | |
| | C | Si | O | S | N | Na | BE (eV) | Area (%) | BE (eV) | Area (%) |
|---|---|---|---|---|---|---|---|---|---|---|
| S-MTS | 29.3 | 21.3 | 47.4 | 2.1 | 0.0 | 0.0 | 285.1 | 71.4 | 163.7 | 97.9 |
| | | | | | | | 286.8 | 28.6 | 167.9 | 2.1 |
| 3421-8 | 34.8 | 17.5 | 42.7 | 1.4 | 2.0 | 1.7 | 284.8 | 58.1 | 163.6 | 62.6 |
| | | | | | | | 286.0 | 30.6 | 168.4 | 37.4 |
| | | | | | | | 288.4 | 11.1 | | |
| 3241 | 37.7 | 16.7 | 41.0 | 1.4 | 1.5 | 1.7 | 285.1 | 75.3 | 163.9 | 70.3 |
| | | | | | | | 286.5 | 13.6 | 168.3 | 29.7 |
| | | | | | | | 288.5 | 11.1 | | |
| 3340 | 35.8 | 18.3 | 43.0 | 0.3 | 1.3 | 1.2 | 285.1 | 70.5 | 163.8 | 70.3 |
| | | | | | | | 286.4 | 18.1 | 168.3 | 29.7 |
| | | | | | | | 288.4 | 11.4 | | |
| 3214 | 36.0 | 15.2 | 39.3 | 3.9 | 2.7 | 3.0 | 285.0 | 79.3 | 163.8 | 60.2 |
| | | | | | | | 286.6 | 8.2 | 168.4 | 39.8 |
| | | | | | | | 288.3 | 12.5 | | |
| 1423 | 35.8 | 16.1 | 39.9 | 3.4 | 3.1 | 1.7 | 285.1 | 71.4 | 163.8 | 60.4 |
| | | | | | | | 286.5 | 17.0 | 168.3 | 39.6 |
| | | | | | | | 288.4 | 11.6 | | |

Scheme 1. Grafting copolymers onto a glass slide and PDMSe A. Hydrolysis of a glass slide and PDMSe. B. Silanization of MTS to a hydrolyzed glass slide and PDMSe. C. Grafting acrylate-based polymers onto MTS-coupled slide and PDMSe surface.

A.

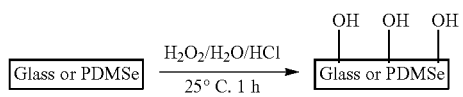

B.

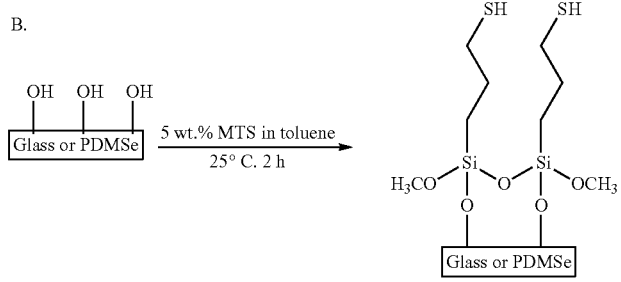

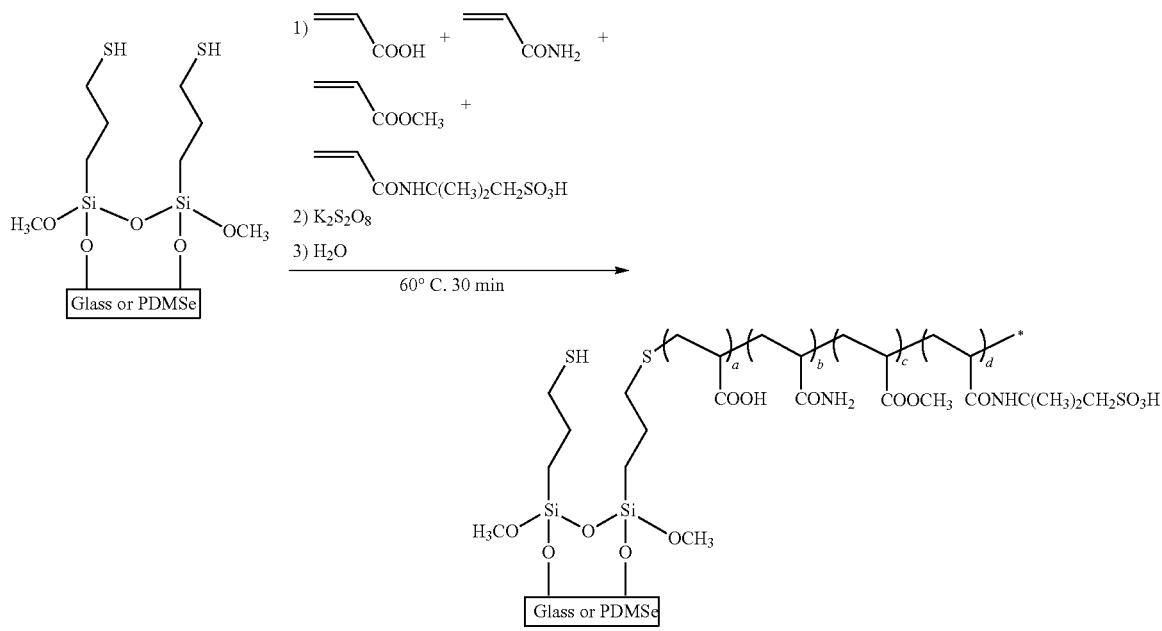

TABLE 3

Static water (WT), diiodomethane (DM) and glycerol (GL) contact angle, dynamic WT contact angle (advancing and receding) and hysteresis of S-MTS (MTS-coupled glass slide), sample 3421, 3241, 3340, 3214 and 1423. Ten points and three spots were measured on each sample for sessile drop and dynamic contact angle respectively. The value expressed as average ± standard deviation.

| Sample | WT Static | WT Dynamic advancing | WT Dynamic receding | WT hysteresis | DM Static | GL Static |
|---|---|---|---|---|---|---|
| S-MTS | 62.6 ± 2.0 | 67.1 ± 1.9 | 37.0 ± 0.6 | 30.1 | 37.3 ± 1.1 | 48.9 ± 1.1 |
| 3421 | 35.8 ± 3.1 | 45.8 ± 0.5 | 18.4 ± 0.4 | 27.4 | 37.6 ± 2.1 | 22.3 ± 1.2 |
| 3241 | 46.4 ± 5.4 | 51.1 ± 0.2 | 22.3 ± 1.2 | 28.8 | 39.3 ± 1.2 | 28.4 ± 1.1 |
| 3340 | 51.3 ± 6.4 | 63.4 ± 0.7 | 26.3 ± 1.7 | 37.1 | 37.2 ± 0.4 | 37.1 ± 0.9 |
| 3214 | 30.5 ± 3.5 | 38.0 ± 2.0 | 11.0 ± 1.6 | 27.0 | 34.1 ± 0.7 | 18.1 ± 1.6 |
| 1423 | 40.2 ± 1.6 | 46.4 ± 1.3 | 17.7 ± 2.5 | 28.7 | 30.5 ± 0.7 | 28.3 ± 1.1 |

TABLE 4

The liquid surface tension ($\gamma_L$) of WT, DM, GL and their correspondent components: polar ($\gamma_L^P$), dispersion ($\gamma_L^d$), Lifshitz-van der Waals ($\gamma_L^{LW}$), Lewis acid ($\gamma_L^+$), Lewis base ($\gamma_L^-$) and acid-base interaction ($\gamma_L^{AB}$)

| Test Liquid | $\gamma_L$ (mJ/m²) | $\gamma_L^P$ (mJ/m²) | $\gamma_L^d$ (mJ/m²) | $\gamma_L^{LW}$ (mJ/m²) | $\gamma_L^+$ (mJ/m²) | $\gamma_L^-$ (mJ/m²) | $\gamma_L^{AB}$ (mJ/m²) |
|---|---|---|---|---|---|---|---|
| WT | 72.8 | 51.0 | 21.8 | 21.8 | 25.5 | 25.5 | 51.0 |
| DM | 50.8 | 1.3 | 49.5 | 50.8 | 0.0 | 0.0 | 0.0 |
| GL | 63.4 | 27.4 | 36.0 | 34.0 | 3.9 | 57.4 | 30.0 |

TABLE 5

The values of surface energies ($\gamma_S$), polar and dispersion component ($\gamma_S^P$ and $\gamma_S^d$) of S-MTS and copolymer-grafted samples calculated from OWK method.

| Sample | Liquid pair | $\gamma_S^P$ (mJ/m²) | $\gamma_S^d$ (mJ/m²) | $\gamma_S$ (mJ/m²) |
|---|---|---|---|---|
| S-MTS | WT-DM | 16.9 | 33.8 | 50.7 |
|  | GL-DM | 10.3 | 35.6 | 45.8 |
|  | mean | 13.6 | 34.7 | 48.3 |
| 3421 | WT-DM | 32.1 | 30.8 | 62.9 |
|  | GL-DM | 27.1 | 31.7 | 58.8 |
|  | mean | 29.6 | 31.2 | 60.8 |
| 3241 | WT-DM | 27.5 | 30.9 | 58.3 |
|  | GL-DM | 24.7 | 31.4 | 56.0 |
|  | mean | 26.1 | 31.1 | 57.2 |
| 3340 | WT-DM | 21.7 | 32.9 | 54.5 |
|  | GL-DM | 18.0 | 33.6 | 51.6 |
|  | mean | 19.8 | 33.2 | 53.1 |
| 3214 | WT-DM | 32.6 | 32.2 | 64.8 |
|  | GL-DM | 27.2 | 33.1 | 60.3 |
|  | mean | 29.9 | 32.7 | 62.6 |
| 1423 | WT-DM | 25.4 | 34.9 | 60.3 |
|  | GL-DM | 20.5 | 35.9 | 56.3 |
|  | mean | 23.0 | 35.4 | 58.3 |

TABLE 6

The values of surface energies ($\gamma_S$), Lifshitz-van der Waals ($\gamma_S^{LW}$), Lewis acid ($\gamma_S^+$), Lewis base ($\gamma_S^-$) and acid-base interaction ($\gamma_S^{AB}$) parameters of S-MTS and copolymer-grafted samples calculated from LW-AB method.

| Sample | $\gamma_S^{LW}$ (mJ/m²) | $\gamma_S^{AB}$ (mJ/m²) | $\gamma_S^+$ (mJ/m²) | $\gamma_S^-$ (mJ/m²) | $\gamma_S$ (mJ/m²) |
|---|---|---|---|---|---|
| S-MTS | 40.9 | 8.2 | 0.9 | 18.7 | 49.1 |
| 3421 | 40.8 | 19.3 | 3.1 | 29.9 | 60.4 |
| 3241 | 40.0 | 17.6 | 3.2 | 24.1 | 57.6 |
| 3340 | 41.0 | 13.4 | 2.3 | 19.9 | 54.4 |
| 3214 | 42.4 | 19.7 | 3.2 | 30.4 | 62.1 |
| 1423 | 44.0 | 15.3 | 2.4 | 24.0 | 59.3 |

TABLE 7

The weight and graft density of copolymers
on sample 3421, 3241, 3340, 3214 and 1423.

| Sample | Weight of copolymer (μg) | Graft density (μg/cm2) |
|---|---|---|
| 3421 | 373 ± 92 | 9.2 ± 2.1 |
| 3241 | 380 ± 53 | 9.3 ± 1.3 |
| 3340 | 330 ± 95 | 8.1 ± 2.3 |
| 3214 | 507 ± 51 | 12.4 ± 1.3 |
| 1423 | 500 ± 56 | 12.3 ± 1.4 |

Each sample was weighed three times for the calculation of the graft density. The value expressed as average ± standard deviation.

Example 2

This example was conducted to determine the effect of low molecular weight molecules disposed upon a textured surface. Its results show that bioadhesion can be controlled if desired by altering chemistry on the surface of a substrate. The textured surface with the low molecular polymer disposed upon the textured surface was compared with a smooth surface that had the same polymer disposed thereon. The experiment showed that spore settlement densities were lower on all the samples containing the acrylates than on polydimethylsiloxane (PDMSe) standards (up to 91% reduction), and that attachment strength was considerably weaker on the 3421 and 3241 treatments than on the other coatings. For the current study two of the copolymers, 3214 and 3340 were selected for further evaluation by grafting onto smooth and patterned PDMSe substrates.

All samples were equilibrated in de-ionised water for 24 hours prior to testing. Following this, samples were immersed in seawater for one hour before the start of the experiment. The copolymers provided for this example were synthesized from a mixture of acrylic acid (AA), acrylamide (AAm), methyl acrylate (MA) and 2-acrylamido-2-methyl-propane-sulfonate (AMPS) in aqueous solution, which formed a poly(AA-co-AAm-co-MA-co-AMPS). The 4 digit numbers of the sample name refer to the monomer ratios of AA, AAm, MA and AMPS before polymerization. For example, sample name "3214" refers to 30% AA, 20% AAm, 10% MA and 40% AMPS.

The acrylate copolymers were disposed on the surfaces shown in the Table 8 below.

TABLE 8

| Label | Pattern | AA(%) hydrophilic + negative charge | AAM(%) hydrophilic | MA(%) hydrophobic | AMPS(%) extremely hydrophilic |
|---|---|---|---|---|---|
| 3214 SM | Smooth | 30 | 20 | 10 | 40 |
| 3214 SK | +2.8SK2x2 | 30 | 20 | 10 | 40 |
| 3340 SM | Smooth | 30 | 30 | 40 | 0 |
| 3340 SK | +2.8SK2x2 | 30 | 30 | 40 | 0 |
| PDMSe SM | Smooth | — | — | — | — |
| PDMSe SK | +2.8SK2x2 | — | — | — | — |

Table 8 above reflects acrylate-modified PDMSe samples, and PDMSe (Silastic T2) samples. "3214 SM" in the Table 8 refers to a smooth PDMSe sample with an acrylate copolymer comprising 30 wt % AA, 20 wt % AAM, 10 wt % MA and 40 wt % AMPS disposed thereon. "3214 SK" reflects a PDMSe sample having a texture defined by +2.8SK2×2 disposed thereon. The FIG. 2 shows such a texture along with the nomenclature (+2.8SK2×2) for such a texture. The "SK" refers to term "SHARKLETS®" and refers to a pattern similar to that found on the skin of sharks. The term 3214 SK therefore refers to a patterned surface upon which an acrylate copolymer comprising 30 wt % AA, 20 wt % AAM, 10 wt % MA and 40 wt % AMPS is disposed. The copolymer is disposed only upon the elevated surfaces of the texture and not upon the base surface upon which the texture is disposed. The grafting of these copolymers onto the surfaces is shown in the Scheme 1 in Example 1.

Zoospores were obtained from mature Ulva plants. Zoospores were settled in individual dishes containing 10 ml of zoospores ($1.5 \times 10^6$ ml$^{-1}$) in the dark at ~20° C. After 45 minutes the slides were washed in seawater to remove unsettled zoospores. Samples were fixed using 2.5% glutaraldehyde in seawater before counts were made. The density of zoospores attached to the surfaces was counted on each of 3 replicate slides using an image analysis system attached to a fluorescence microscope. Spores were visualised by autofluorescence of chlorophyll. Counts were made for 30 fields of view (each 0.15 mm$^2$) on each slide.

Slides settled with zoospores for 45 minutes by the above method, were exposed to a shear stress of 50 Pa created by the turbulent flow of seawater in a specially designed water channel. Following this, the slides were counted as described above. The number of spores remaining attached was compared with unexposed control slides (the same as used to determine settlement). The number of cells in 30 fields of view (each 0.15 mm$^2$) was counted on each of 3 replicate slides.

Figure 3:
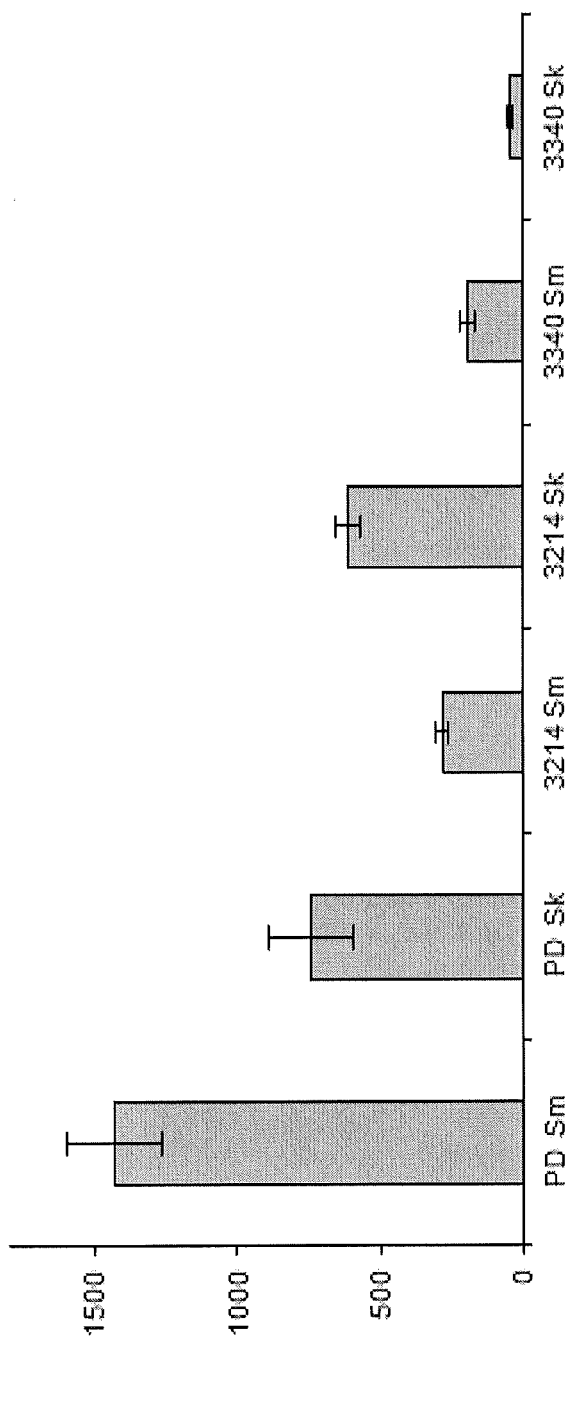
FIG. 3 is a bar graph showing the settlement density for the Ulva spores on the respective surfaces shown in Table 8.

The density of settled spores on the smooth PDMSe was high, which indicated that the spores were 'aggressive settlers'. The spore settlement density on the SHARKLET® (SK) patterned standard PDMSe samples was reduced by approximately 50% compared to the smooth surface. This is shown in the FIG. 3. The FIG. 3 is a bar graph showing the settlement density for the Ulva spores on the respective surfaces shown in Table 8.

Spore settlement densities were lower on both of the smooth acrylate-modified PDMSe samples than on the corresponding PDMSe standard. However, the response of the spores to the "SK" pattern on the two acrylate coatings differed markedly from each other. In the case of the 3214 copolymer, the pattern increased spore settlement density, whilst on the 3340 it decreased it.

Figure 4:
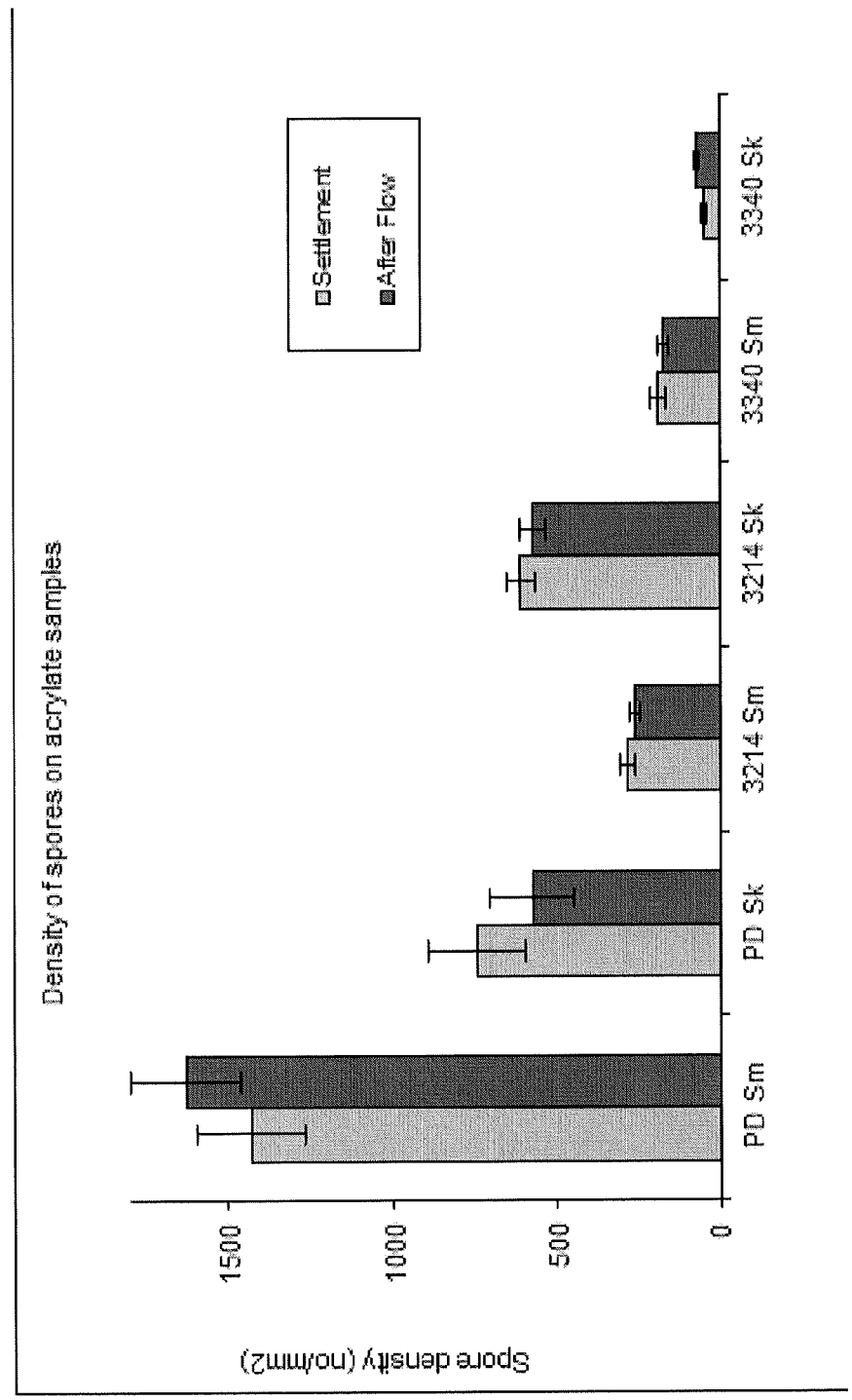
FIG. 4 is a bar graph that depicts the spores remaining on the surface after being exposed to a shear stress of 50 Pa.

Exposure to a shear stress of 50 Pa (Pascals) in the water channel did not remove any spores from any of the test surfaces (See FIG. 4). The FIG. 4 is a bar graph that depicts the spores remaining on the surface after being exposed to a shear stress of 50 Pa. Counts made on the samples after exposure to hydrodynamic forces were approximately the same as those on the unexposed samples (the PDMSe "SK" pattern before and after flow is unlikely to be significantly different).

The data indicates that the performance of the coatings was affected by surface chemistry. It is now well established that patterns fabricated in PDMSe inhibit the settlement of spores, but this may not always be the case when the surface chemistry is altered. In these studies the presence of the pattern elevated spore settlement densities on the 3214 acrylate-modified PDMSe samples to nearly double that on the smooth samples. The design of the test surfaces purposely ensured that all samples had the same modulus, and consequently the differences in settlement densities must be caused by characteristics of the surface chemistry. These could be surface wettability related, but more samples would need to be run to confirm this. The experiment should be repeated to verify these interesting results. Thus by controlling the surface chemistry, the spores can either be rejected by the surface or permitted to settle on the surface. Bioadhesion can thus be controlled.

Example 3

This example was conducted to demonstrate attachment and release of Navicula on smooth and SHARKLET® ("SK") patterned acrylate-modified PDMSe samples. The current study investigated the attachment of diatoms to the same range of coatings as in the Example 2. In general, diatom cells adhere less strongly to hydrophilic surfaces compared to hydrophobic surfaces. The difference in hydrophobicity between the smooth experimental samples (static drop CA 77-80°) compared to PDMSe (108°) would be expected to be sufficient to cause a small reduction in attachment strength. An additional decrease in attachment strength on the SHARKLET® ("SK") pattern (shown in the FIG. 2) might be expected since the pattern fabricated in PDMSe has consistently caused a small (ca. 20%) reduction in adhesion strength. The nomenclature adopted for this example was the same as that for the Examples 1 and 2 and is appropriately detailed in these examples.

Table 9 is a listing of the various samples that were tested with the Navicula in this example.

TABLE 9

| Sample name | Details |
|---|---|
| SM-T2 | Smooth |
| SK-T2 | +2.8SK2x2 |
| SM3214 | Smooth |
| SK3214 | +2.8SK2x2 |
| SM3340 | Smooth |
| SK3340 | +2.8SK2x2 |

All samples were equilibrated in de-ionized water for 24 hours prior to testing. Following this, samples were immersed in seawater for one hour before the start of the experiment. Navicula cells were cultured in a F/2 medium contained in 250 ml conical flasks. After 3 days the cells were in log phase growth. Cells were washed 3 times in fresh medium before harvesting and diluted to give a suspension with a chlorophyll a content of approximately 0.25 $\mu g.ml^{-1}$. Cells were settled in individual dishes containing 10 ml of suspension at ~20° C. on the laboratory bench. After 2 hours the slides were exposed to a submerged wash in seawater to remove cells which had not attached (the immersion process avoided passing the samples through the air-water interface). Samples were fixed in 2.5% glutaraldehyde, air dried and the density of cells attached to the surface were counted on each slide using an image analysis system attached to a fluorescence microscope. Counts were made for 30 fields of view (each 0.15 $mm^2$) on each slide.

Slides with attached cells of Navicula were exposed to a shear stress of 52 Pa in a water channel. Samples were fixed and the number of cells remaining attached was counted using the image analysis system described above.

Figure 5:
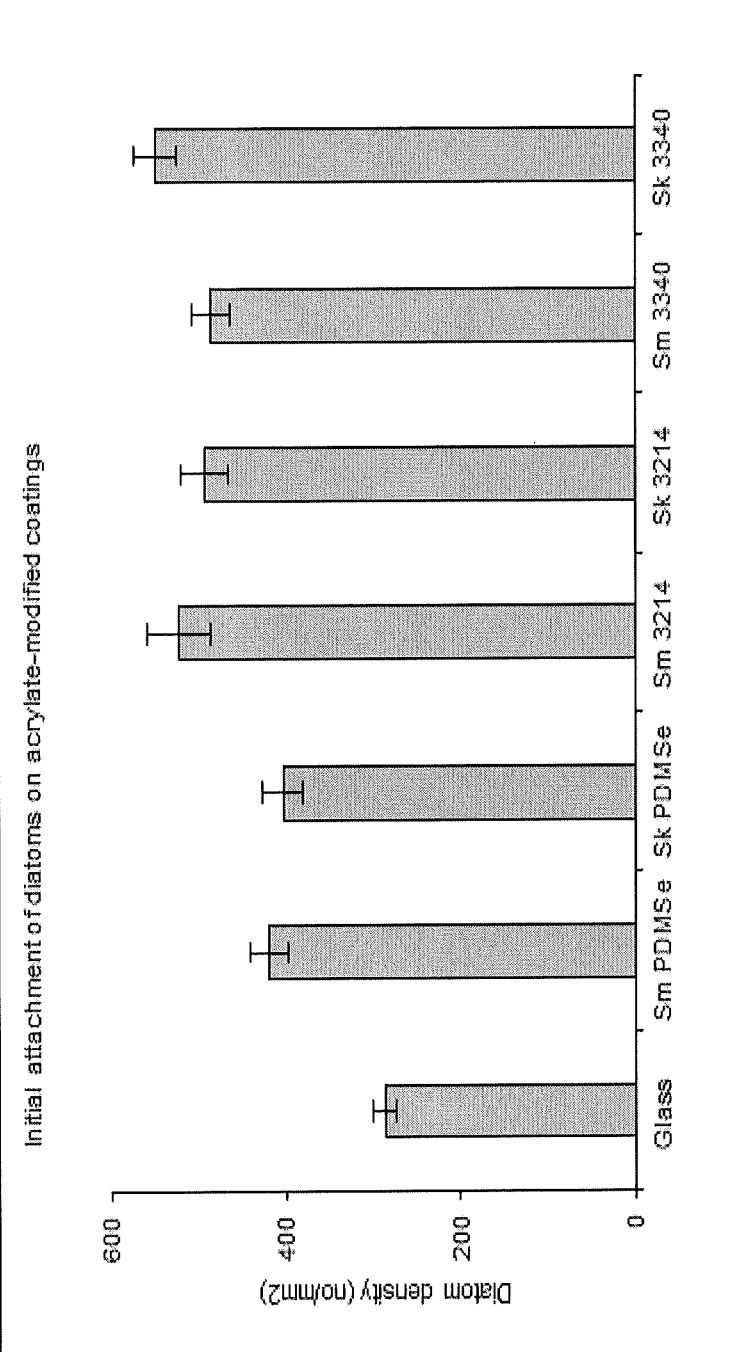
FIG. 5 shows the initial attachment of diatoms on acrylate-modified PDMSe samples.

The initial attachment density of diatoms was higher on all the acrylate modified samples than on the smooth or "SK" patterned PDMSe standards as seen in the FIG. 5. FIG. 5 shows the initial attachment of diatoms on acrylate-modified PDMSe samples. Each mean is from 90 counts, 30 on each of 3 samples. Bars show 95% confidence limits.

Figure 6:
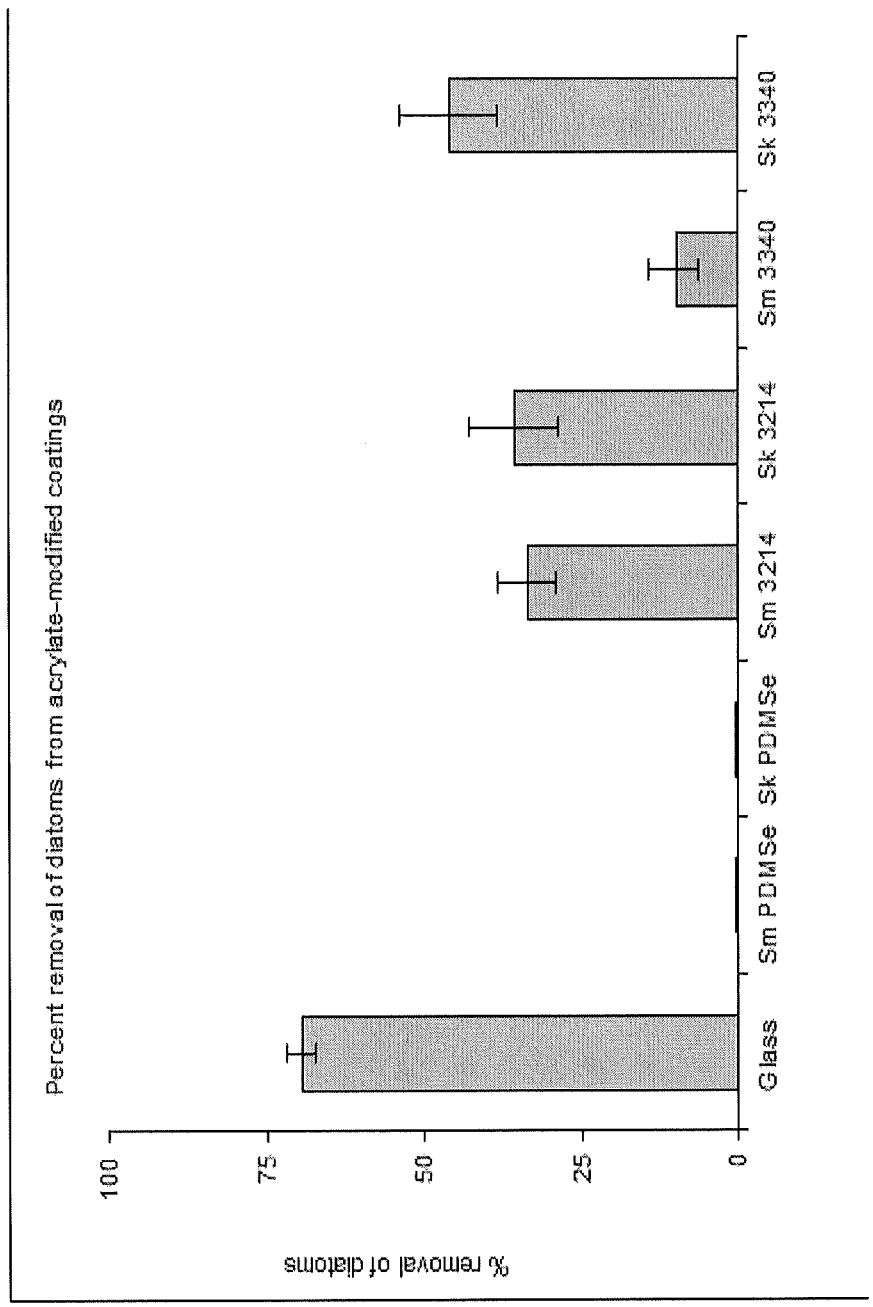
FIG. 6 is a bar graph showing the amount of diatoms that are displaced as a result of the exposure to shear stress.

Exposure to a shear stress of 52 Pa in the water channel indicated that diatoms were more weakly attached to the acrylate-modified samples than to the PDMSe samples (see FIG. 6). FIG. 6 is a bar graph showing the amount of diatoms that are displaced as a result of the exposure to shear stress. This is probably due to the greater wettability of these samples as indicated by their lower contact angles (Appendix B). The presence of the "SK" pattern weakened the attachment of Navicula on sample 3340, but the pattern made no difference to attachment strength on the 3214 sample.

Previous experiments have indicated that Navicula attached less strongly (by c.a. 20%) to 2.8SK2x2 "SK" patterns than to smooth PDMSe, with the result that initial attachment tends to be lower and percent removal higher on the patterned surfaces. In this experiment there was no difference in initial attachment or removal between the smooth and patterned surfaces. The adhesion strength of diatoms can vary between experiments and the results suggest that the adhesion to the PDMSe was higher in this experiment than in the previous studies.

The attachment of diatoms to the acrylate-modified PDMSe samples was different to that on smooth PDMSe. As with the Ulva data of Example 2, the diatom data indicate that the performance of the "SK" patterns can be affected by surface chemistry. The presence of the "SK" pattern increased diatom removal from the 3340 acrylate-modified sample, but not from the 3214 sample or the PDMSe.

Furthermore, samples aged at atmospheric conditions, in air, indicated that the polydimethylsiloxane main chains undergo diffusion that "buries" the acrylate copolymer effectively reducing the anti-fouling potential. It is however noteworthy that the inversion of the acrylate grafts below the surface may be an effective fouling release mechanism that destabilizes the bond of organisms to the material.

The present invention is thus expected to have broad application for a variety of products. Exemplary products that can benefit from the bioadhesion resistance provided by coating architectures according to the invention include, but are not limited to, the following:

a. biomedical implants, such as breast plant shells or other fluid filled implant shells;
b. biomedical instruments, such as heart valves;
c. Hospital surfaces, e.g., consider film (electrostatic) applications to surfaces that can be readily replaced between surgeries;
d. Clothing/protective personal wear;
e. Biomedical packaging;
f. Clean room surfaces, such as for the semiconductor or biomedical industry;
g. Food industry, including for packaging, food preparation surfaces;
h. Marine industry-including exterior surfaces of marine vessels including ships and associated bilge tanks and gray water tanks and water inlet/outlet pipes;
i. Water treatment plants including pumping stations;
j. Power plants;
k. Airline industry;
l. Furniture industry, such as for children's cribs;
m. Transportation industry, such as for ambulances, buses, public transit, and
n. Swimming pools The articles may find utility in biomedical implants, such as breast plant shells or other fluid filled implant shells; biomedical instruments, such as heart valves; hospital surfaces (e.g., consider film (electrostatic) applications to surfaces that can be readily replaced between surgeries); clothing/protective personal wear; biomedical packaging, such as, for example, the outside surface of sterilized packaging; clean room surfaces, such as, for example, the semiconductor or biomedical industry; food industry, such as, for example, food packaging, food preparation surfaces; marine industry, such as, for example, exterior surfaces of marine vessels including ships and associated bilge tanks, gray water tanks and water inlet/outlet pipes; water treatment plants, such as, for example, pumping stations; power plants; airline industry; furniture industry, such as, for examples, for children's cribs, handles on exercise equipment, and exercise equipment; in the transportation industry, such as, for example, in ambulances, buses, public transit; swimming pools and other structures that are used in aquatic environments; and the like. Additional details of the types of articles and surfaces upon which the pattern can be disposed are provided below.

The articles may include medical devices, medical implants, medical instruments that are used internal or external to the body of living beings. The term "living beings" can include warm blooded animals, cold blooded animals, trees, plants, mammals, fishes, reptiles, amphibians, crustaceans, and the like. The medical devices, medical implants and medical instruments may be temporarily or permanently inserted into the body of the living being. Examples of medical devices, medical implants and medical instruments are endotracheal tubes; stents; shells used to encapsulate implants such as, for example, breast implant shells; breast implants; ear tubes; heart valves; surfaces of bone implants; surfaces of grafted tissues; surfaces of contact lens; components and surfaces of dialysis management devices such as, for example, a dialysis line; components and surfaces of urinary management devices such as, for example, a urinary catheter; components and surfaces of central venous devices such as, for example, a urinary catheter; surfaces of implanted devices such as, for example, pacemakers, artificial pancreas, and the like; ports on catheters such as, for example, feeding tube ports, implanted venous access ports. It is to be noted that the patterns can be varied to permit bioadhesion or to resist bioadhesion. These variations include geometrical variations, dimensional variations, variations in surface chemistry, or the like. These variations may be static or dynamic variations.

As noted above, the articles can include surfaces of bone implants, such as, for example, an orthopedic implant or other implant in a hip joint replacement or repair, knee replacement or repair, shoulder replacement or repair, elbow replacement or repair, and an ankle replacement or repair. The article can also be used as a surface in implantable medical devices where the goal is to cause cells (e.g., progenitor and/or stem cells) to differentiate themselves; the topography of the patterned surface causing this differentiation to occur. As noted above, these medical devices may be implanted permanently or temporarily.

The article can also include the outer and inner surfaces of devices, instruments, furniture, and the like. The articles can be used in hospitals, healthcare centers, dental offices, dispensaries, gymnasiums, rehabilitation facilities, bathrooms, waiting rooms, and the like. As listed below, the articles include hospitals, healthcare centers, dental offices, dispensaries, gymnasiums, rehabilitation facilities, bathrooms, waiting rooms, and the like. The articles can be used on the surfaces of an electrostatic film applied to operating room surfaces between surgeries; on the surfaces of surgical drapes used to cover patients and/or shield doctors from fluids; on the surfaces of waiting room chairs and waiting room furniture; on the surfaces of operating room instruments; on the surfaces of operating room instrument trays; on high tough surfaces in hospital rooms; on bedside table surfaces; on bedrail switch panel (e.g., control panels) surfaces; on cover surfaces (polymer covers of various thicknesses and dimensions) such as bed sheets and on other surfaces where keeping the surface clean is important. The surfaces of the aforementioned devices, instruments and furniture may be textured, or alternatively a film having a textured surface can be attached to the device, instrument and furniture using permanent or temporary means of attachment such as adhesives, static electricity, mechanical interlocking devices such as nails, screws, nuts, clips, bevel joints, dove tail joints, and the like.

The articles can include touch screens such as, for example, a computer screen cover—especially a touch screen cover—where keeping the surface clean is desirable. The film used to protect the touch screen can contact the screen or its frame using the permanent or temporary means of attachment discussed above.

The articles can include the inner and outer surfaces of medical packaging such as the surfaces of a sterile package. It can also include all bed rail coverings in hospitals, medical facilities and nursing stations. The article can include all bathroom, locker room and waiting room surfaces, especially on all bathroom and waiting room surfaces in hospitals, office buildings, schools, colleges, stadiums, and other places where mass gatherings of people take place and where there is an increased probability of disease transmission.

For example, in bathroom, locker room and waiting room surfaces, it can be disposed on the surfaces of toilets, sinks, hand washing areas, hand drying areas, mirrors, doors, door handles, door locks, push plates located on door surfaces, supporting rails in the bathrooms, surfaces of sources of illumination (e.g., the overhead lighting in a dentists office), and the like. The article includes filter for filtering particles in the nanometer and micrometer ranges.

The article includes all surfaces of an ambulance. The article includes all work surfaces that are contacted by the health care provider (e.g., emergency medical technicians, doctors, nurses, laboratory technicians) or by the patient. In another embodiment, the pattern can also be disposed on all surface of Class I medical devices such as, for example, thermometer tips, pens and other stationary, doctor/nurse gowns and clothing used by health care providers.

The article includes the surface of plows that are used to collect and shovel snow (e.g., snow plows). The snowplow can be rendered self-cleaning Ice that normally adheres to the snowplow will be easily removed, providing for a clean plowed surface.

The article includes surfaces such as window panes, wind shields, eye glasses, and the like. Since the features of the article can be smaller than the wavelength of visible light, the viewing surface will not scatter light. In addition, the presence of the texture will render the surface self cleaning In one embodiment, the article can include the surfaces of laboratory culture dishes where the attachment of organisms to any surface inside the dish is not desired (e.g., the pattern causes lesser attachment rate than would otherwise be the case). In another embodiment, the article can include laboratory culture dish where the attachment of an organism to any surface inside the dish is desired (e.g., the pattern causes greater attachment rate than would otherwise be the case).

In one embodiment, the article includes surface of devices that can be used to carry or to transport medical equipment or medical components (e.g., a contact lens carrying case, packaging for catheters, packaging for guidewires, packaging for needles, packaging for syringes, and the like).

In another embodiment, article includes surfaces that are contacted by living beings both inside and outside of hospital or health care facilities. The surfaces can be metallic or non-metallic. For example, it can be disposed on the surfaces of bathroom fixtures such as toilet seats, shower tiles, towel racks, shower curtains, and the like. It can also be disposed on the surfaces of kitchens and dining halls (e.g., kitchens in restaurants, homes, hospitals, and the like) and instruments used in kitchens such as, for example, countertops, sinks, refrigerator surfaces, microwave surfaces, oven surfaces, stove top surfaces, food trays (e.g., those used in airlines, ships and on buses), the surfaces of knives, forks, spoons, ventilators, and the like.

The articles include instruments and/or surfaces used in an office, gymnasium or laboratory environment such as, for example, work table surfaces (e.g., metallic or non-metallic), chair surfaces, handles of chairs, computer surfaces, keyboards, surfaces of a mouse, surfaces of memory sticks, clean room surfaces, exercise equipment surfaces, surfaces of public buses and trains (e.g., grab rails or other surfaces such as push bars on doors that are contacted by living beings), and the like.

The article includes surfaces used in the transportation of food-stuffs such as plastics, textiles, textile nets, serrated plastics, and the like. The article includes food packaging, packaging for fruits and vegetables (e.g., carrots, tomatoes, potatoes, corn, apples, grapes, mangoes, cauliflower, oranges, peaches, tangerines, nectarines, lettuce, cabbage, eggplant, okra, onions, nuts, dates, figs, lemons, lime, grapefruit, walnuts, cashew, pecans, and the like).

The article includes surfaces used in water filtration used in fresh and saline water treatment facilities. For example, it can be used on the inner and outer surfaces of pipes and hoses used to transfer water or other fluids, filters, nozzles, valves, heaters, granular particles, and the like.

It can also be used in devices that are used to transform fluids from a first state to a second state. For example, it can be used on surfaces of devices that are used to transform liquids to gases, gases to solids, solids to liquids and gases to liquids. It can also be used on the surfaces of devices that contact flowing fluids. It can be used on the surfaces of ice makers, vaporizers, humidifiers, air conditioners, fans, propellers, airfoils (e.g., the leading edge and trailing edges of airplane wings), wind tunnels, exterior body panels of automobiles, ships, airplanes, solar panels, wind turbines, turbine blades, siding (e.g., metallic siding such as aluminum, steel, wooden siding and plastic siding) used on the exterior and interior surfaces of buildings, ducts that transport air inside buildings, and the like. The article includes packaging for thermal insulation used in the interior of structures (e.g., buildings, airplanes, ships, and the like), construction surfaces (e.g., the surface of wooden beams, metal beams, plastic beams, bricks, dry wall, and the like), and the like, to prevent the buildup of spores and mold when such surfaces contact moisture over extended periods of time.

The article includes the internal and external surfaces of electronic devices used for entertainment; communications; signal transmission; capturing images; capturing and transmitting auditory signals; and the like. Examples of entertainment devices are solid-state musical devices (e.g., iPODS®), solid-state gaming devices and electronic toys (e.g., NINTENDO DS®, LEAPSTER®), and the like. Examples of communication devices are cell phones (e.g., Motorola i870, iPhone, and the like), personnel digital assistant (PDA) phones (e.g., Blackberry), laptops, iBooks, and the like. Examples of image capturing devices are optical lenses, digital cameras, infrared cameras, infrared scopes, night vision goggles, and the like. Examples of devices for capturing auditory signals are blue tooth headsets, earphones, and the like.

The article includes surfaces that contact the mucous membranes of living beings. For example, it can be used on all surfaces that are contacted by the human mouth especially those surfaces that contact the mouths of toddlers. Examples of surfaces that are contacted by the mouths of toddlers are high chair trays, pacifiers, diaper changing pads, crib frames and rails, reusable and disposable water bottles, cups and mugs, coffee thermos, toys, blocks, coins, and the like.

The articles may also be used as blood thinners.

The article includes the surface of a variety of miscellaneous items such as, for example, clothing and accessories, sunglass lenses, frames of sunglasses, eye glass lenses, surfaces and frames of aquariums, outdoor clothing, water resistant jackets, coats, sports clothing, swimsuits, wetsuits, surfboards, outdoor equipment, tents, lanterns, lamps, tickets (e.g., to sporting events, airline tickets, train and ship tickets), shirt and dress collars, textile surfaces that contact armpits and other private parts of the body, and the like. Such surfaces can be marketed as being antimicrobial surfaces.

The article includes the surfaces of camping equipment (e.g., tents, poles, lamps, and the like), camping gear, sports equipment (e.g., parachutes, parachute rigs, parachute bags, insides and outsides of shoes, insoles, and the like), and the like. Such equipment can be marketed as water resistant equipment that deters microorganism aggregation. It can also be marketed as deterring the buildup of odor in shoes and underwear.

The article includes marine vessels and other devices that contact water. For example, it can include boat hulls, intake and outlet pipes for industrial and power plants, drilling rig for underwater surfaces, fish tanks and aquariums, boat surfaces (above the hull), bilge tanks, water treatment plants and pumping station surfaces—any surface inside such a water treatment plant and pumping station where organism growth and colonization is an issue. The articles includes bags used to grow algae, for example, it can be used on the surface of a bag used to grow any microorganism but prevent attachment of the microorganism onto the surface of bag (medical or marine—e.g., blood bags where it is desirable to deter organism attachment to bag).

The article includes surfaces of body parts that are used in surgeries such as, for example, in a colostomy, and the like. It can also be used in replacement joints, plates, tendon and ligament ends for enhanced tissue adaptation, vascular implants, grafts, shunts, access, and the like. The article also includes the inner and outer surfaces of periodontal dressings; intravenous catheters and ports; foley catheters; surfaces in contact with tissues such as, for example, plates; adhesive tapes, patches, bandages, and the like; electronic leads; dental implants; orthodontia devices; iols (intraocular lenses); hydrogel films for tissue enhancement, skin grafting, isolation of bacteria from tissues; heart-lung machine surfaces to reduce infection, clotting/thrombosis, enhance flow; tissue constructs for organ/tissue genesis; dialysis machine components, tubing and control panels; cochlear/otolaryngology implants and electronic devices; pace maker leads and body; fibrillator leads and body; heart valve flow surfaces and fixation surfaces; spinal implants; cranial/facial implants; biomedical instruments such as, for example, heart valves; scalpels; tongs; forceps; saws; reamers; grippers; spreaders; pliers; hammers; drills; laryngoscopes; bronchoscopes; oesophagoscopes; stethoscopes, mirrors, oral/ear speculum, xray plates/frames, xray device surfaces, magnetic resonance imaging (MRI) surfaces, echo cardiogram surfaces, cat-scan surfaces, scales, clipboards, and the like.

The article includes all hospital surfaces. For example, it can be used as a film to be applied to surfaces that can be readily replaced between surgeries. For example, it can be applied to such surfaces as listed below using electrostatic adhesion, mechanical interlocking or adhesives. The film can be used on table tops, MRI/CAT scan surfaces, X-ray surfaces, scales, operating tables, door push panels, devices or articles that are contacted by human beings such as, for example, light switches, control panels, beds, incubators, monitors, remote controls, call buttons, door push bars, preparation surfaces, instrument trays, pharmacy surfaces, pathology tables, outside surfaces of bed pans, identification surfaces on walls, clothing/protective personal wear, gloves, cling films to attach temporary in public rest rooms/areas, baby changing cling films, films for attaching to bottoms of purses/bags/suitcases, biomedical packaging, such as the outside surface of sterilized packaging; vacuum formed trays/films, cling films for short and long term use, clean room surfaces, such as, for example, those used for the semiconductor or biomedical industry, table tops, push bars, door panels, control panels, instruments, entrance/exit points, food industry, including for packaging, food preparation surfaces, counter tops, cutting boards, trays, entrance/exit points, switches, control panels, scales, packaging equipment operator contact points, marine industry, exterior surfaces of marine vessels including ships, bilge tanks, gray water tanks, water inlet/outlet pipes, power drive systems, propellers, jet ports, water treatment plants including pumping stations, inlet/outlet pipes, control panel surfaces, laboratory surfaces, power plants, inlet/outlet pipes, control surfaces, airline industry, trays on seatbacks, entry/exit push surfaces, bathroom doors, service carts, arm rests, furniture industry, children's cribs, handles on exercise equipment, exercise equipment contact surfaces, changing tables, high chairs, table tops, food prep surfaces, transportation industry, ambulances, buses, public transit, swimming pools.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. An article comprising:
   a polymeric substrate; where the polymeric substrate is functionalized with a reactive group;
   a polymer disposed upon the substrate; the polymer having a number average molecular weight of about 2,000 to about 5,000 grams per mole; where the polymer is a copolymer consisting of monomers of acrylic acid, acrylamide, acrylamido-2-methyl-propanesulfonate and methyl acrylate.

2. The article of claim 1, where the reactive group is a silane, a carboxylic acid group, an amine group, a vinyl group, an epoxide group or a combination thereof.

3. The article of claim 1, where the acrylic acid is present in an amount of about 1 to about 60 wt %, based on the total weight of the polymer; where the acrylamide is present in an amount of about 1 to about 60 wt %, based on the total weight of the polymer; and where the methyl acrylate is present in an amount of about 1 to about 60 wt %, based on the total weight of the polymer and where the acrylamido-2-methyl-propanesulfonate acrylate is present in an amount of about 1 to about 60 wt %, based on the total weight of the polymer.

4. The article of claim 1, where the article produces a reduction in biosettling of about 50 to about 100 percent when compared with a comparative surface that does not contain the polymer.

5. The article of claim 1, having a second polymer having a number average molecular weight of greater than 5,000 grams per mole disposed upon the substrate.

6. The article of claim 1, where the article is a ship.

7. The article of claim 1, where the article is a hospital surface that is contacted by living beings.

8. The article of claim 1, where the article is blood thinner.

9. The article of claim 1, where the article has a textured surface.

10. The article of claim 1, where the article has a smooth surface.

11. The article of claim 1, where each polymer chain is separated from a neighboring polymer chain by an average distance of about 2.5 Angstroms to about 5,000 Angstroms.

12. A method comprising:
   disposing upon a polymeric substrate a polymer; the polymer having a number average molecular weight of 2,000 to about 5,000 grams per mole; where the polymer is a copolymer consisting of monomers of acrylic acid, acrylamide, acrylamido-2-methyl-propanesulfonate and methyl acrylate; and where the polymeric substrate is functionalized with a reactive group.

13. The method of claim 12, where the disposing comprises reacting covalently the polymer with the substrate.

* * * * *